(12) United States Patent
Chow et al.

(10) Patent No.: US 7,458,542 B2
(45) Date of Patent: *Dec. 2, 2008

(54) LANDING GEAR DOOR ASSEMBLY

(75) Inventors: Leung Choi Chow, Bristol (GB); David Leonard Rondeau, Bristol (GB); Christopher Neil Wood, Cheshire (GB)

(73) Assignee: Airbus UK Limited, Bristol (GB)

( * ) Notice: Subject to any disclaimer, the term of this patent is extended or adjusted under 35 U.S.C. 154(b) by 314 days.

This patent is subject to a terminal disclaimer.

(21) Appl. No.: 10/504,253

(22) PCT Filed: Apr. 7, 2004

(86) PCT No.: PCT/GB2004/001534

§ 371 (c)(1),
(2), (4) Date: Aug. 10, 2004

(87) PCT Pub. No.: WO2004/089743

PCT Pub. Date: Oct. 21, 2004

(65) Prior Publication Data

US 2006/0060707 A1     Mar. 23, 2006

(30) Foreign Application Priority Data

Apr. 7, 2003   (GB) .................................. 0308002.5
Apr. 8, 2003   (EP) .................................. 03252217

(51) Int. Cl.
  *B64C 25/10*   (2006.01)
(52) U.S. Cl. ................................................. 244/102 R
(58) Field of Classification Search ............ 244/100 R, 244/102 R, 102 A, 129.1, 129.4, 129.5, 101, 244/102 SL, 102 SS, 121, 130; 49/246–248, 49/255
See application file for complete search history.

(56) References Cited

U.S. PATENT DOCUMENTS 2,129,824 A  *  9/1938  De Seversky ........... 244/102 R (Continued)

FOREIGN PATENT DOCUMENTS

DE             743883            1/1944

(Continued)

*Primary Examiner*—Tien Dinh
(74) *Attorney, Agent, or Firm*—Patterson, Thuente, Skaar & Christensen, P.A.

(57) ABSTRACT

An aircraft landing gear door assembly (1, 2, 3, 4, 5) includes a door (1), which is moveable to an open position, in which an aperture (6) is exposed, the landing gear (10) being able to be deployed through said aperture (6), and moveable to a closed position, in which the door (1) is closed across the aperture (6). The door (1) is arranged for rotational movement of a first type, in which the door rotates about an axis that is substantially parallel to the length of the aircraft, between the closed position and the open position. The door (1) is also arranged for movement of a second type, different from the first type, in which the door (1) rotates, about an axis that is substantially transverse to the length of the aircraft, to a position in which it acts as a fairing to reduce the noise caused by the landing gear or a part thereof. In one embodiment, the second type of movement is rotational movement about an axis that is substantially parallel to the door when in the closed position and the door (1) forms a ramp type fairing. In another embodiment, the second type of movement is rotational movement about an axis that is substantially transverse to the door when in the closed position and the door (31) forms a V-shaped fairing (when viewed from above) with an opposite door (33).

36 Claims, 15 Drawing Sheets

U.S. PATENT DOCUMENTS

Figure 1:
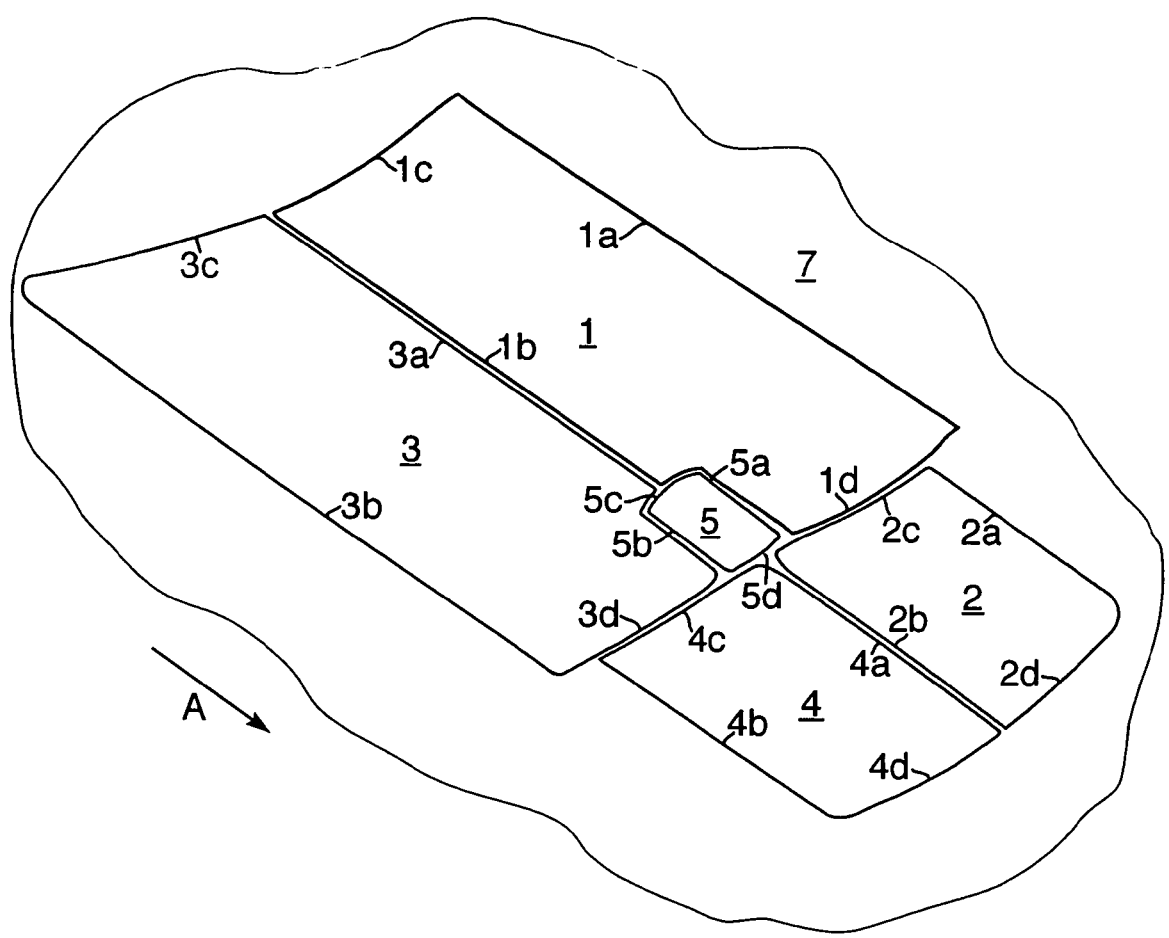

| | | | |
|---|---|---|---|
| 2,176,461 A | 10/1939 | Larsen | |
| 2,180,462 A * | 11/1939 | De Seversky | 244/102 R |
| 2,362,919 A * | 11/1944 | Miller | 244/102 R |
| 2,388,365 A * | 11/1945 | Nevin | 244/102 R |
| 2,431,093 A * | 11/1947 | Trich | 244/102 R |
| 2,548,832 A | 4/1951 | Tydon | |
| 2,552,843 A * | 5/1951 | Clifton et al. | 244/102 R |
| 2,670,156 A * | 2/1954 | Clark et al. | 244/63 |
| 2,750,134 A * | 6/1956 | Hawkins, Jr. et al. | 244/102 R |
| 2,869,806 A * | 1/1959 | Beach | 244/102 R |
| 3,485,465 A | 12/1969 | Churchill | |
| 4,408,736 A * | 10/1983 | Kirschbaum et al. | 244/100 R |
| 4,845,804 A * | 7/1989 | Garrett | 16/19 |
| 5,058,827 A * | 10/1991 | Dansereau et al. | 244/103 R |
| 6,345,786 B1 * | 2/2002 | Sakurai | 244/102 R |
| 6,499,694 B2 * | 12/2002 | Roloff | 244/129.4 |
| 6,536,711 B1 * | 3/2003 | Conway et al. | 244/129.5 |
| 6,854,689 B1 * | 2/2005 | Lindahl et al. | 244/102 R |
| 2005/0230549 A1 * | 10/2005 | White et al. | 244/129.4 |

FOREIGN PATENT DOCUMENTS

| | | |
|---|---|---|
| EP | 1 067 045 A1 | 1/2001 |
| GB | 1141142 | 1/1969 |

\* cited by examiner

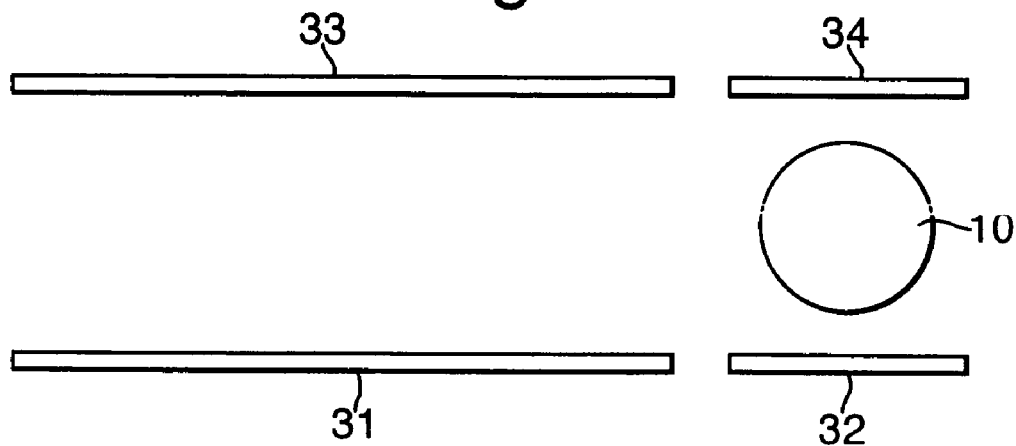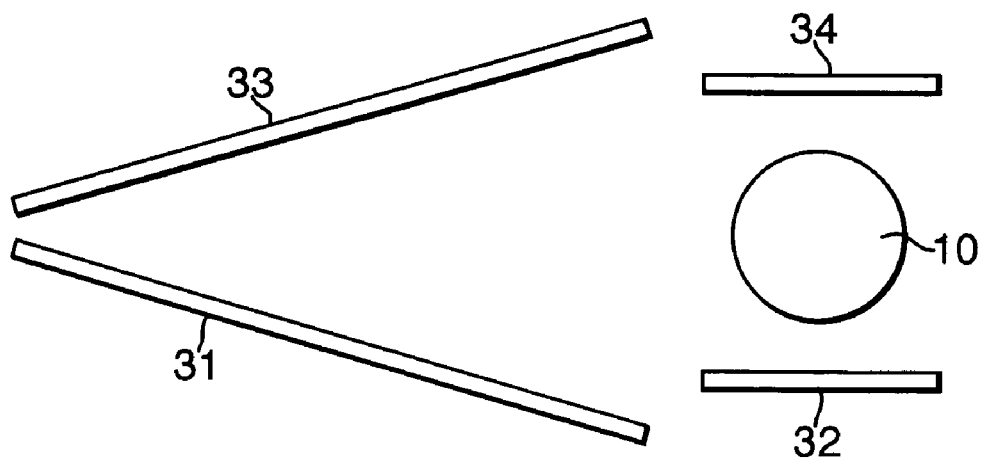

LANDING GEAR DOOR ASSEMBLY

The present invention relates to an aircraft landing gear door assembly. In particular, the invention relates to an aircraft landing gear door assembly designed to reduce the noise generated by the interaction of the landing gear and the air flowing past it during flight, take-off and/or landing.

It is desirous to reduce the noise generated by aircraft, for example, to lessen disruption or inconvenience, resulting from aircraft noise, caused to the public on the ground near airports. A significant amount of noise is generated by the interaction of the aircraft and the air flowing past it, which results in turbulent flows and consequently noise. It is particularly important to reduce noise created during approach of the aircraft on landing. During approach, a significant contribution to the amount of noise that the aircraft generates is made by the landing gear, which is typically deployed early for landing for safety reasons. The deployment of the landing gear increases drag and assists deceleration of the aircraft. During take-off, noise from the landing gear is a less significant factor because engine noise is generally greater and because the landing gear is generally stowed at the earliest opportunity to reduce drag and aid take-off. During normal flight, the landing gear of an aircraft is typically stowed in a landing gear bay, the bay being closed off by doors so that no part of the landing gear is subjected to the air flow.

It is an object of the invention to provide an aircraft landing gear door assembly that reduces the amount of noise generated by the aircraft during landing and approach on landing. For example, it is an object of the present invention to provide a landing gear door assembly, wherein the noise generated is less than the noise that would generated if a landing gear door assembly of the same size were used but which has not been adapted, designed or manufactured in accordance with the present invention.

According to a first aspect of the invention there is provided an aircraft landing gear door assembly including a door, which is moveable to an open position, in which the landing gear can be deployed through an aperture, and moveable to a closed position, in which the door is closed across the aperture, wherein at least a part of the door is arranged for movement of a first type, in which the door moves between the closed position and the open position, wherein at least a portion of the door is also arranged for movement of a second type, in which said at least a portion of the door moves to a position in which said at least a portion of the door acts as a fairing to reduce the noise caused by the landing gear or a part thereof when the landing gear is in its fully deployed position, and wherein the first type of movement is different from the second type of movement.

By providing a door, or a portion thereof, that is able to be specially moved into a fairing position (by means of the second type of movement), it is possible to use the door to divert the airflow away from the landing gear in a more effective manner than hitherto possible, thereby reducing the amount of noise generated by the interaction of the airflow with the landing gear. Whilst prior art landing gear door assemblies have been proposed, where a door may be left in a half open position acting as a ramp type fairing, thereby diverting airflow away from parts of the landing gear, such proposals have not allowed the movement of the door to be of a type different from that used to move the door between its open and closed positions. Furthermore, such proposals have not been made with the aim of noise reduction in mind. Also, the ability of the door (of that prior art proposal) to act as a noise reducing fairing would in any case be restricted because the door is arranged for only rotational movement about a fixed axis.

The first type of movement is preferably rotational movement and, preferably about an axis, that in use, is substantially parallel to the length of the aircraft.

The first type of movement is preferably rotational movement about an axis disposed at a location adjacent to a longitudinal edge of the aperture.

Preferably the second type of movement is rotational movement. The first and second types of movement may both be rotational movement, the types of movement being different in that the axes of rotation do not coincide. The second type of movement is preferably rotational movement about an axis, that in use, is substantially transverse to the length of the aircraft.

The second type of movement may be rotational movement about an axis, that in use, is substantially parallel to the door when in the closed position. Preferably, the door, or a portion thereof, is rotated about an axis that is substantially horizontal and perpendicular to the longitudinal length of the aircraft to move it to the fairing position.

There is provided, according to a second particularly advantageous aspect of the invention, an aircraft landing gear door assembly including a door, which is moveable to an open position, in which the landing gear can be deployed through an aperture, and moveable to a closed position, in which the door is closed across the aperture, wherein the door is rotatable (which may be equivalent for example to the first type of movement mentioned above) about an axis substantially parallel to the length of the aircraft to move the door between the closed position and the open position, wherein at least a portion of the door is also rotatable (which may be equivalent for example to the second type of movement mentioned above) about an axis, which is both transverse to the length of the aircraft and substantially parallel to the door in its closed position, to move said at least a portion of the door to a position in which it acts as a fairing to reduce the noise caused by the landing gear or a part thereof. In this second aspect of the invention, the second type of movement is preferably rotational movement about an axis disposed at a location adjacent to a fore transverse edge of the aperture. In this aspect, said portion of the door in its fairing position may act as a ramp type fairing.

All parts of the door may be arranged for movement of the first type.

The second type of movement may be rotational movement about an axis, that in use (for example when the door is in the fairing position), is substantially transverse to the door when in the closed position. The second type of movement may be rotational movement about an axis aligned with a part of the surface of the door. At least a part of the door may be rotated about an axis that is substantially vertical to move it to the fairing position. At least a part of the door may be rotated about a moveable axis, the axis moving for example with the door when the door is moved between the open and closed positions. Preferably, the second type of movement is rotational movement about an axis that in use is substantially parallel to a surface of the door and moves with said at least part of the door as it moves between the open and closed positions.

There is provided, according to a third particularly advantageous aspect of the invention, an aircraft landing gear door assembly including a door, which is moveable to an open position, in which the landing gear can be deployed through an aperture, and moveable to a closed position, in which the door is closed across the aperture, wherein the door is rotatable (which may be equivalent for example to the first type of movement mentioned above) about a first axis substantially parallel to the door in its closed position to move the door between the closed position and the open position, wherein at least a portion of the door is also rotatable (which may be equivalent for example to the second type of movement mentioned above) about a second axis to move said at least a portion of the door to a position in which it acts as a fairing to reduce the noise caused by the landing gear or a part thereof, wherein the second axis is, when the door is in its open position, transverse to the door in its closed position.

The first and/or second types of movement are preferably rotational movement about a fixed axis. Whilst it is possible for a door to be mounted such that its movement is a complex combination of translational and rotational movements, fixed-axis rotation provides a simple and reliable design.

The door assembly may be so arranged that the first and second types of movement are effected simultaneously for at least part of the respective movements. For example, said at least a part of the door may begin the movement of the first type (movement between the closed and open positions) and then, before completion of the first type of movement, said at least a portion of the door may begin the movement of the second type (movement into a fairing position). Said at least a part of the door that moves with the first type of movement may of course comprise said at least a portion of the door that moves with the second type of movement and vice versa.

Said at least a portion of the door that moves with the second type of movement may move into a position in which it acts as a fairing simultaneously with said at least a part of the door moving between a closed and an open position. However, it is preferred that the start of the movement of the second type is delayed until said at least part of the door has travelled beyond 50% of the distance from the closed position to the fully open position, and more preferably beyond 75% of the distance. By starting the movement of the second type later, the door assembly may be able to be configured such that the door assembly may still readily be opened by back-up means in the event of failure of any actuation means that may be provided as the primary means for effecting movement of the door(s) of the door assembly. For example, the configuration of the door assembly may be such that moving a portion of the door with the second type of movement prematurely (significantly before the door is fully open) would give rise to aerodynamic loads which would resist movement of the door assembly to its fully open position.

The door preferably comprises a first section and a second section. The first section may be coupled, preferably hinged, to the second section. Preferably, the axes of rotation of the first and second sections of the door for the first type of movement are substantially coincident. Preferably, said at least a portion of the door is the first door section. Said at least a part of the door may be the second door section. Where only a section of the door is rotated into the fairing position, simpler and less expensive mounting and actuating arrangements can be used. Additionally, in certain instances it is advantageous to have a fairing that has a smaller area than the area of the whole door.

The assembly further may comprise a panel section. The panel section is preferably coupled to the door. Preferably a hinge is used to couple the panel section to the door. Said at least a portion of the door may comprise the panel section. Said at least a portion of the door may be in the form of the panel section. Alternatively, the panel section may form no part of the door (in that the panel section is not required to close the aperture that the door closes over). The panel section is preferably rotatable relative to at least a part of the door for movement of the second type. In an especially advantageous embodiment, the panel section can be coupled to a door section. In this instance, the panel section, together with the door section, can be positioned to act as fairings, for example to provide a V-shaped fairing where the point of the V is positioned in front of the landing gear. In use, the point of the V-shaped fairing thereby formed may split the air flowing onto the door section and the panel section, when the door assembly is in the fairing position.

The door is preferably coupled to the aircraft using a coupling mechanism, wherein the coupling mechanism allows movement of the first type and of the second type. The door may be coupled to the aircraft landing gear bay, the aircraft landing gear or other suitable areas of the aircraft.

The coupling mechanism may include two linkages, a first for linking the door to the aircraft for movement of the first type and a second for linking the door to the aircraft for movement of the second type. The assembly may be arranged such that, in use, during movement of the first type the door is coupled to the first linkage and decoupled from the second linkage and during movement of the second type the door is decoupled from the first linkage and coupled to the second linkage. Such a feature may be advantageous, especially in relation to the second aspect of the invention. Means, for example electronic means or a mechanical mechanism, may be provided to prevent the door from being simultaneously decoupled from the first linkage and decoupled from the second linkage.

The coupling mechanism may comprise a rotatable frame. For example, the door may be coupled to the aircraft using a coupling mechanism that includes a rotatable frame, wherein the door is attached to and rotatable about the frame for movement of one of the first and second types, and the frame is attached to and rotatable about the aircraft for movement of the other of the first and second types.

Preferably, the door is attached to and rotatable about the frame for movement of the first type, and the frame is attached to and rotatable about the aircraft for movement of the second type. Thus, the frame may be able to contribute to the fairing effect. In that case, the frame is advantageously open on one side, for example so that the frame does not need to be moved to allow the landing gear to be moved from its stored position (when the landing gear is, for example, wholly contained within the interior of the aircraft, for example within a landing gear bay) to its operative position (the position of the landing gear when ready for landing).

In the fairing position, said at least a portion of the door is preferably positioned to divert air away from at least a portion of the landing gear. Advantageously, said at least a portion of the door is positioned to divert air away from noise generating parts of the landing gear, for example, steering actuators (comprising rods, linkages, and the like), brake actuators and drag stays. Said at least a portion of the door may be positioned to divert air away from further doors of the door assembly.

Said at least a portion of the door may be positioned to divert air in a substantially downwards direction. Said at least a portion of the door may be positioned to divert air in a substantially horizontal direction. Said at least a portion of the door may be positioned to divert air in a downwards and horizontal direction. Preferably, the door assembly is so arranged that when in the fairing position the door assembly splits the airflow. For example, said at least a portion of the door may be positioned to split the airflow, diverting a first portion of the airflow in a first direction and a second portion of the airflow in a second direction. One door or part thereof (possibly including one or more panels coupled thereto) may form at least part of a V-shaped fairing which so splits the airflow. Alternatively, two separate independent panels, doors, or portions of doors, or panels attached to the same, may meet to form a V-shaped fairing which so splits the airflow. For example, an independent door, or portion of a door, or panel attached to the same, may meet a panel that is not part of a door, such as a fairing panel to form a V-shaped fairing which so splits the airflow.

The door assembly preferably further comprises a second door, the second door being movable between open and closed positions, the second door being adjacent to the first door in the open and closed positions. The second door is preferably arranged for movement of the first type to move the second door between the closed and open positions. The fixed axes of rotation of the first and second doors for the first type of movement are preferably substantially coincident. Preferably, the first and second doors are arranged so that they may be arranged to move as a single unit. The first and second doors may be able to be coupled by means of a breakable coupling. The landing gear and the door assembly may be so configured that when the landing gear is fully deployed only a small area of the aperture is filled with the landing gear. The second door may at least partially cover this area when in the closed position. The second door may, for example, be what is commonly referred to as the 'hinge door', for example, of a main landing gear door assembly. The second door may be arranged so that it does not perform the function of a noise-reduction fairing. The first and second doors may be so arranged that when the first door, or a portion thereof, is in the fairing position it diverts air away from the second door.

It is possible to provide respective drives, for example, linear actuators, for each door but it is also possible to provide a drive for the first door only and to move the second door by coupling it to the first door. Thus the first and second doors may be arranged to be coupled to move as a single unit between their open and closed positions, and be decoupled to enable the first door to move independently of the second door between the open position and the fairing position of the first door. Such an arrangement is especially preferred in relation to the second aspect of the invention.

In a conventional door assembly it is common for a pair of doors to be provided. The door assembly may further comprise a third door that is movable between open and closed positions. The first and third doors may form a pair of doors. The third door may be adjacent to the first door in the closed position. The first and third doors may define a pair of doors on opposite sides of the aperture. The third door is preferably arranged for movement of a third type, similarly or identical to the first type, to move the third door between the closed and open positions. The fixed axes of rotation of the first and third doors for the first and third types of movement are preferably substantially parallel. The third door may be movable to and from a fairing position. The third door may be arranged for movement of a fourth type, similar or identical to the second type, to move the third door to the fairing position. The axes of rotation of the first and third doors for the second and fourth types of movement may be substantially coincident, especially when the axis is parallel to the door in the closed position and transverse to the length of the aircraft. In such a case, the first and third doors may be arranged so that they may be moved as a single unit during movement of the second and fourth types, respectively. Such an arrangement is particularly suited to the second aspect of the invention. The axes of rotation of the first and third doors for the second and fourth types of movement may be substantially parallel and spaced apart, especially when the axes are transverse to the doors in the closed position. Such an arrangement is particularly suited to the third aspect of the invention.

It will be understood that, because the first and third doors are a pair, the third door may include any or substantially all of the features of the first door.

It will be understood that the words "first", "second" and "third", when used in relation to doors, are being used herein merely for ease of distinguishing between doors having different features. Therefore, whilst reference is made to second and third doors, it should be understood that it is within the scope of the invention to provide a door assembly including the third door, but not the second door, and vice versa.

The assembly preferably includes locking devices for locking some or all of the doors in their closed, open and/or fairing positions.

Reference is made herein to the doors, axes or other things being transverse to other doors, axes or other things. It will be understood that whilst the word "transverse" is used to cover preferred arrangements where the angle in question is about 90 degrees (say, between 75 and 105 degrees), the term transverse is also used to cover angles that might not be considered as strictly being perpendicular. For example, the term transverse may cover angles ranging from 50 degrees to 130 degrees. Similarly, the word "parallel" and the term "substantially parallel" may cover angles significantly different from 0 degrees. For example, an axis may be considered as being substantially parallel to a surface (which need not necessarily be flat) provided that the angle of separation is less than 30 degrees.

The landing gear door assemblies described herein may be associated with a nose landing gear, a main landing gear or other type of landing gear. It will be understood that in this context the term main landing gear is a landing gear that sustains a significant share of the loads sustained by the landing gear of the aircraft during landing and would normally for that reason exclude the nose landing gear.

The invention also provides an aircraft including a landing gear door assembly according to the invention described herein.

According to the invention there is also provided a method of reducing noise caused by landing gear on an aircraft including a step of manufacturing a landing gear door assembly according to the invention described herein.

Figure 2:
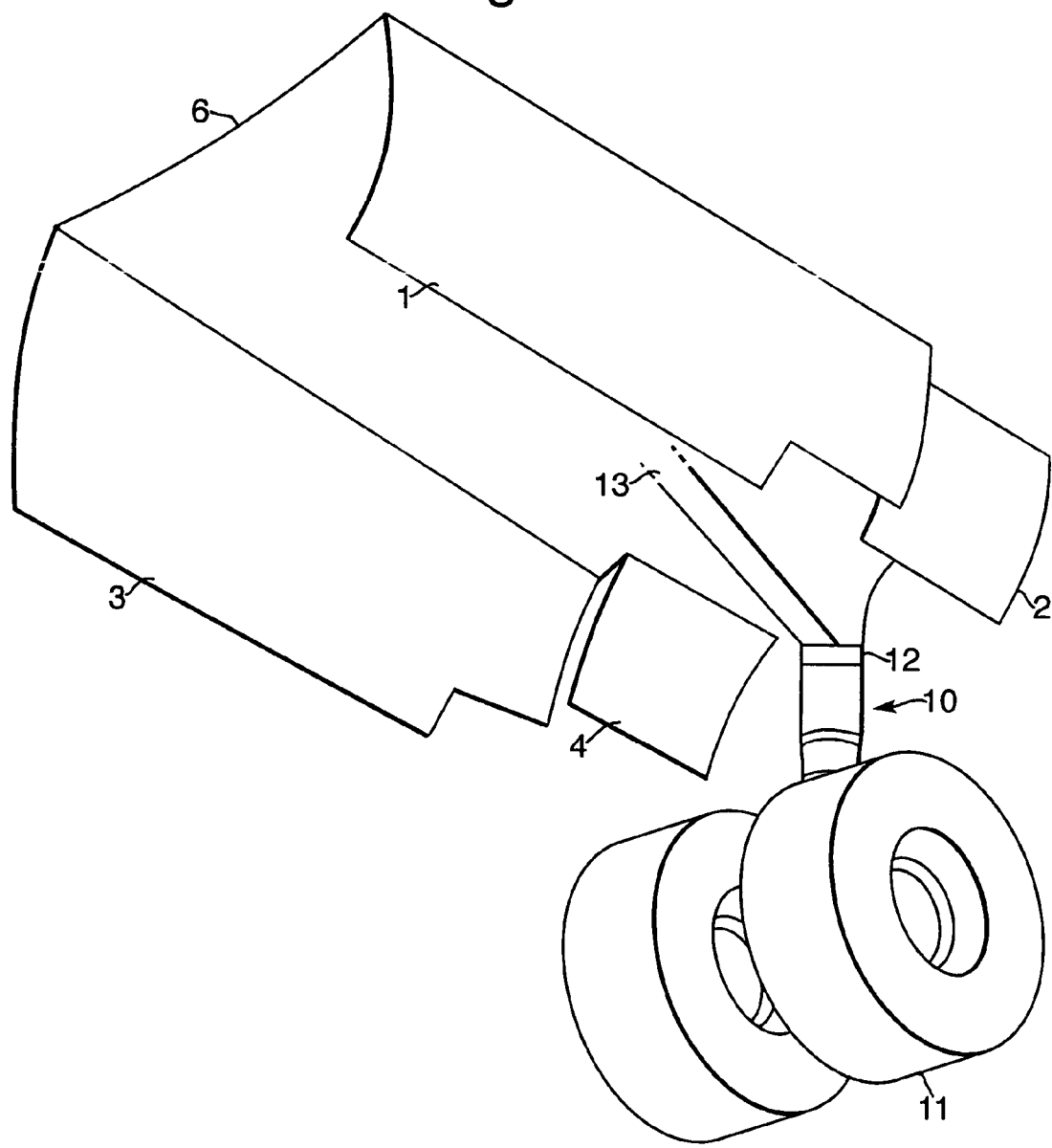
Figure 3:
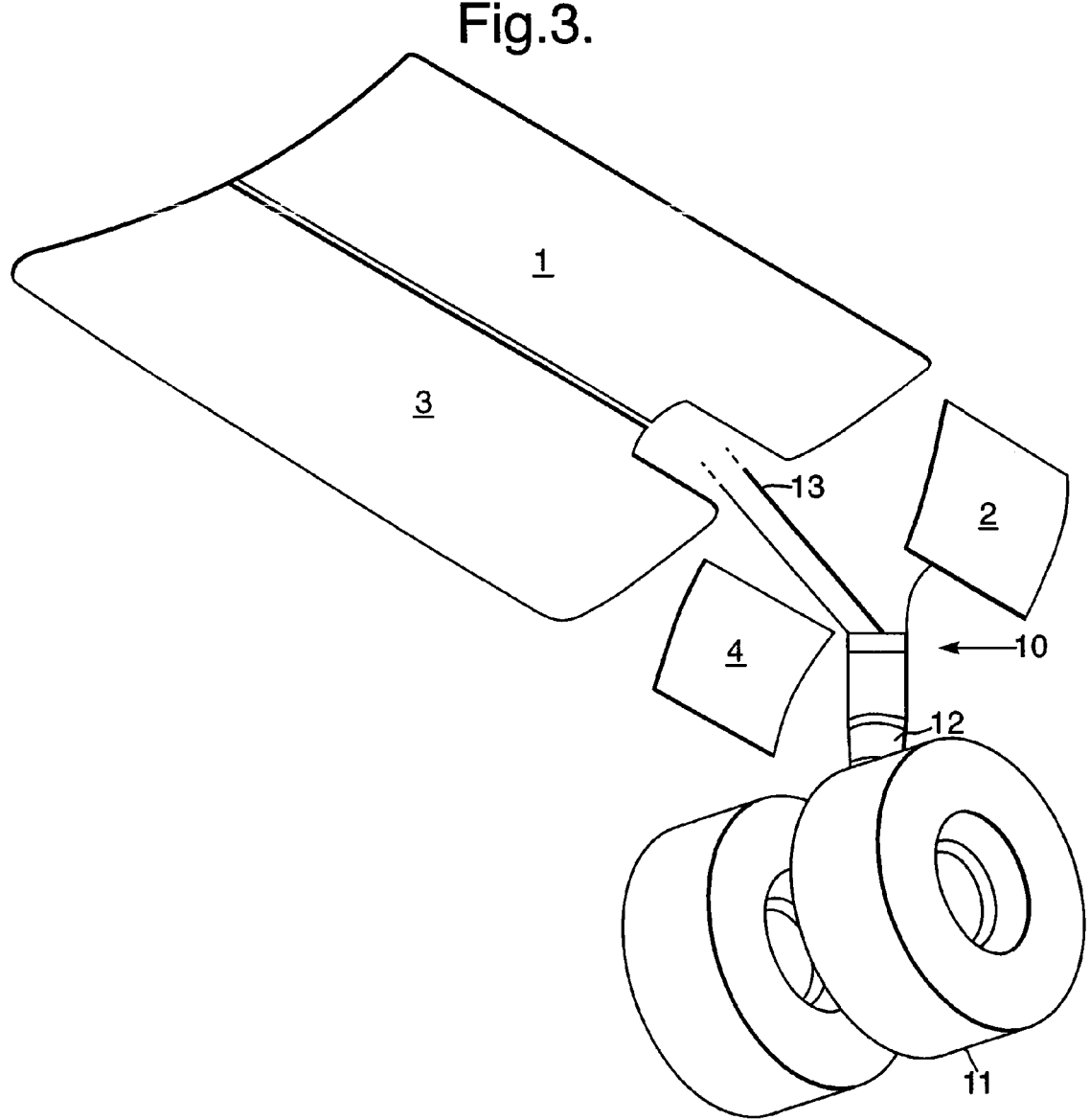
Figure 4:
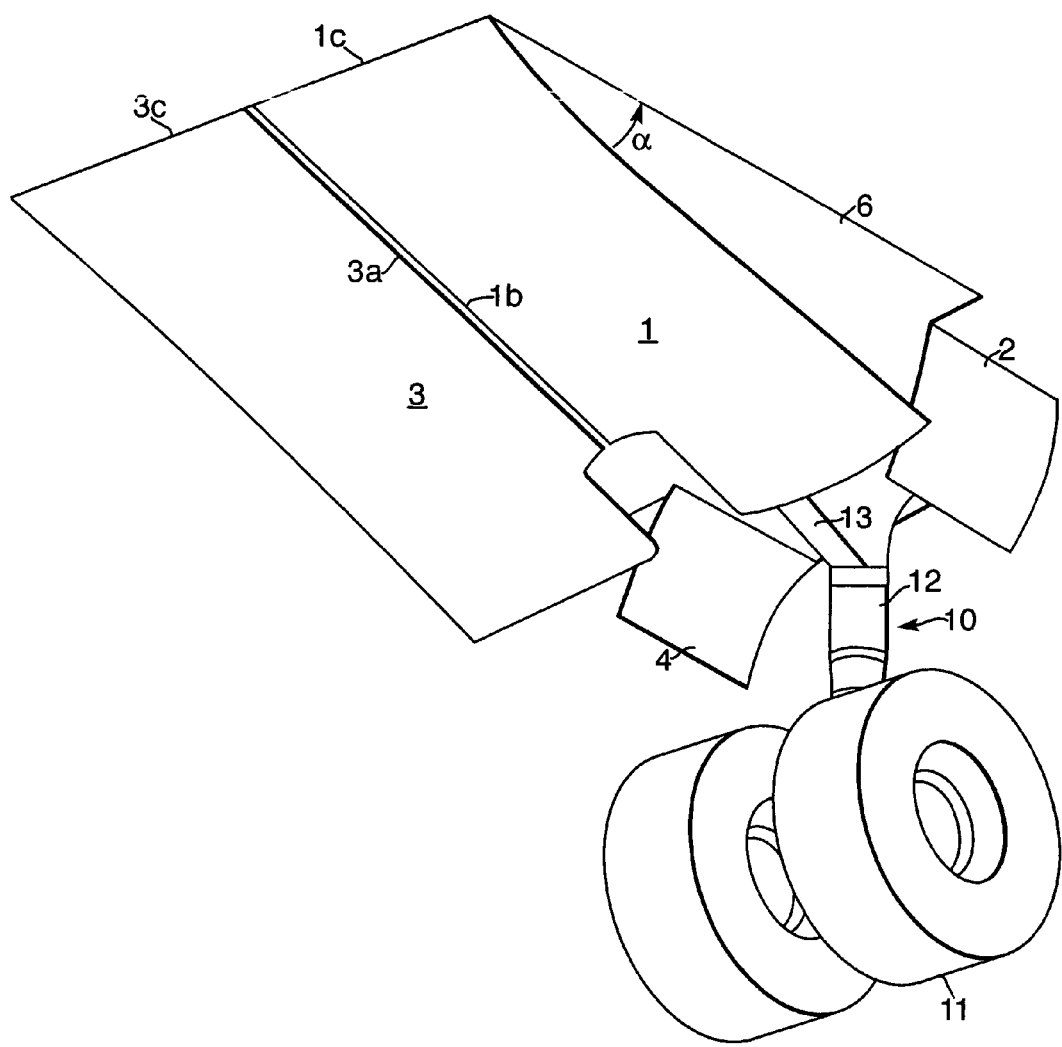
Figure 5:
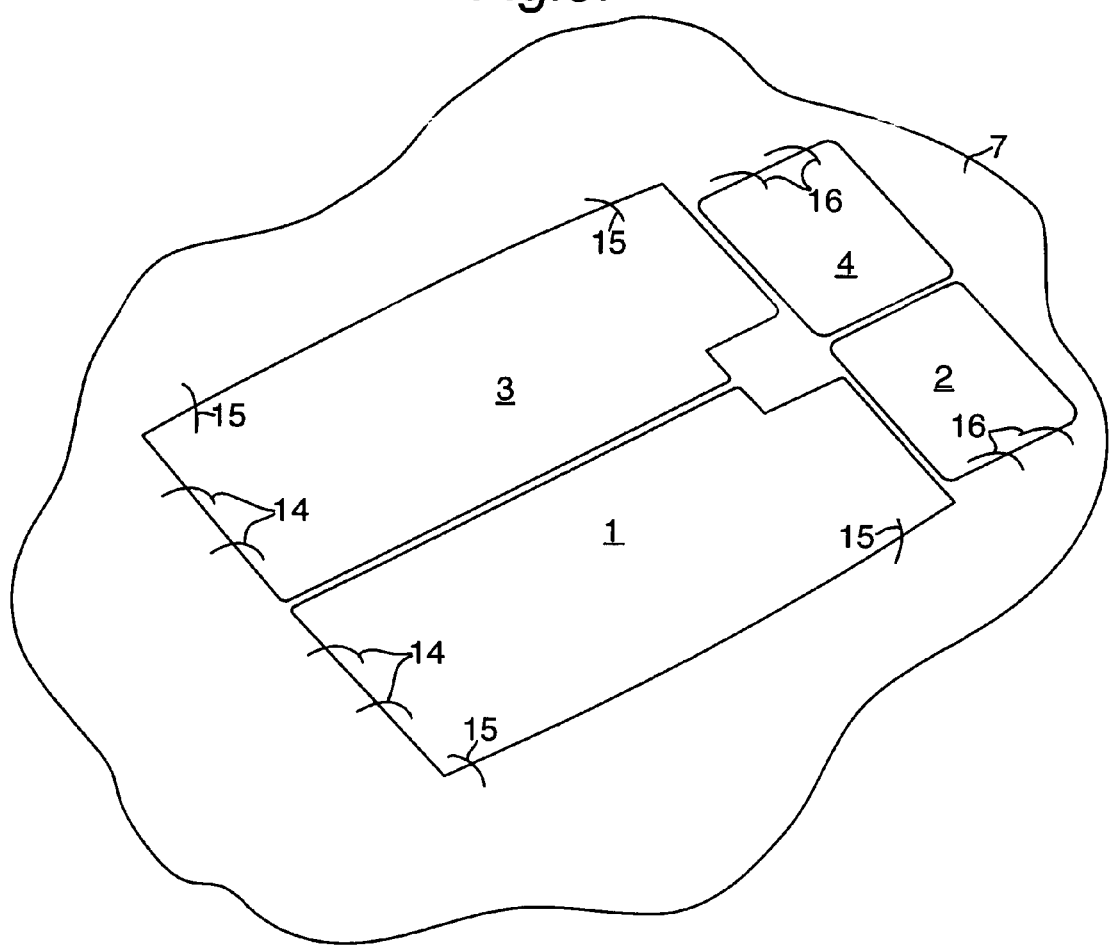
Figure 6:
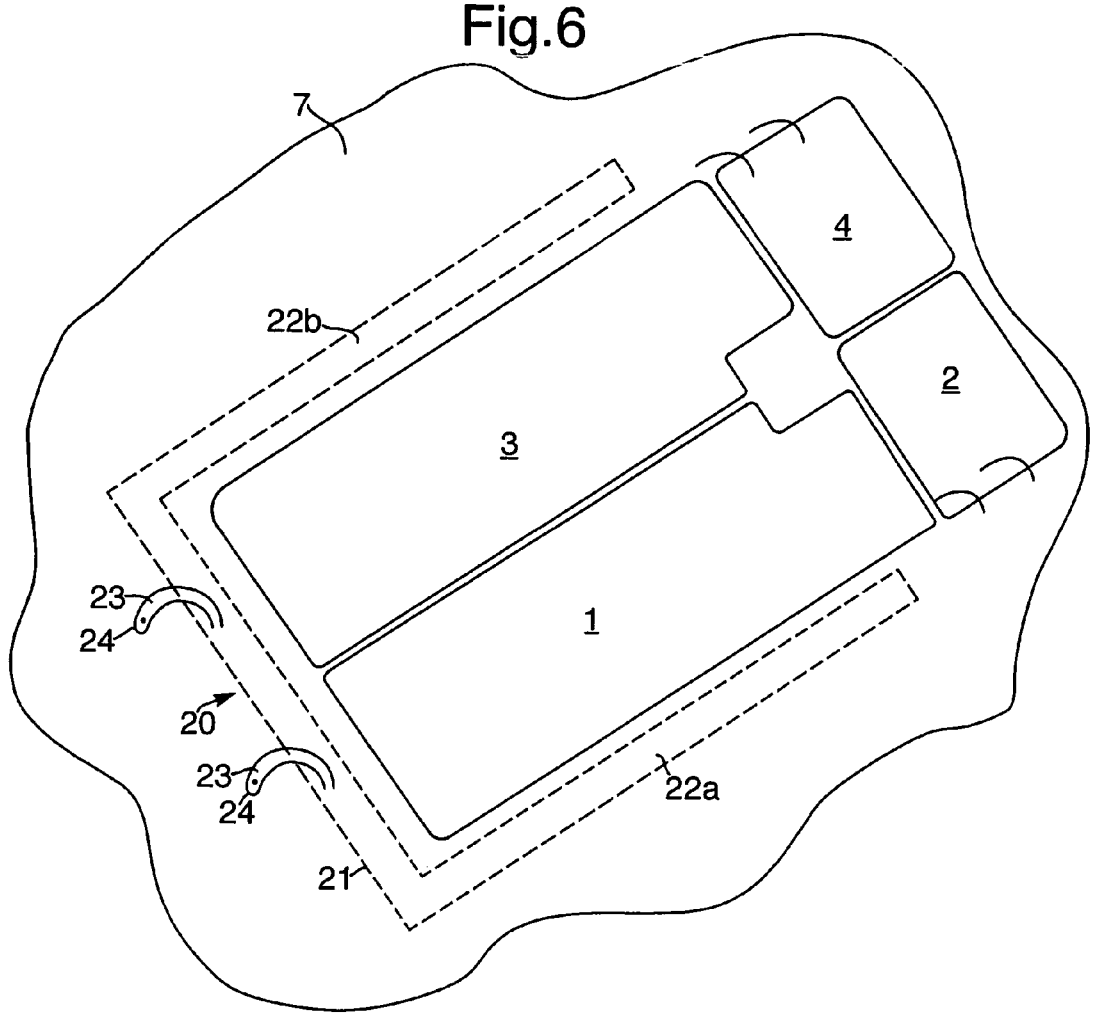
Figure 7:
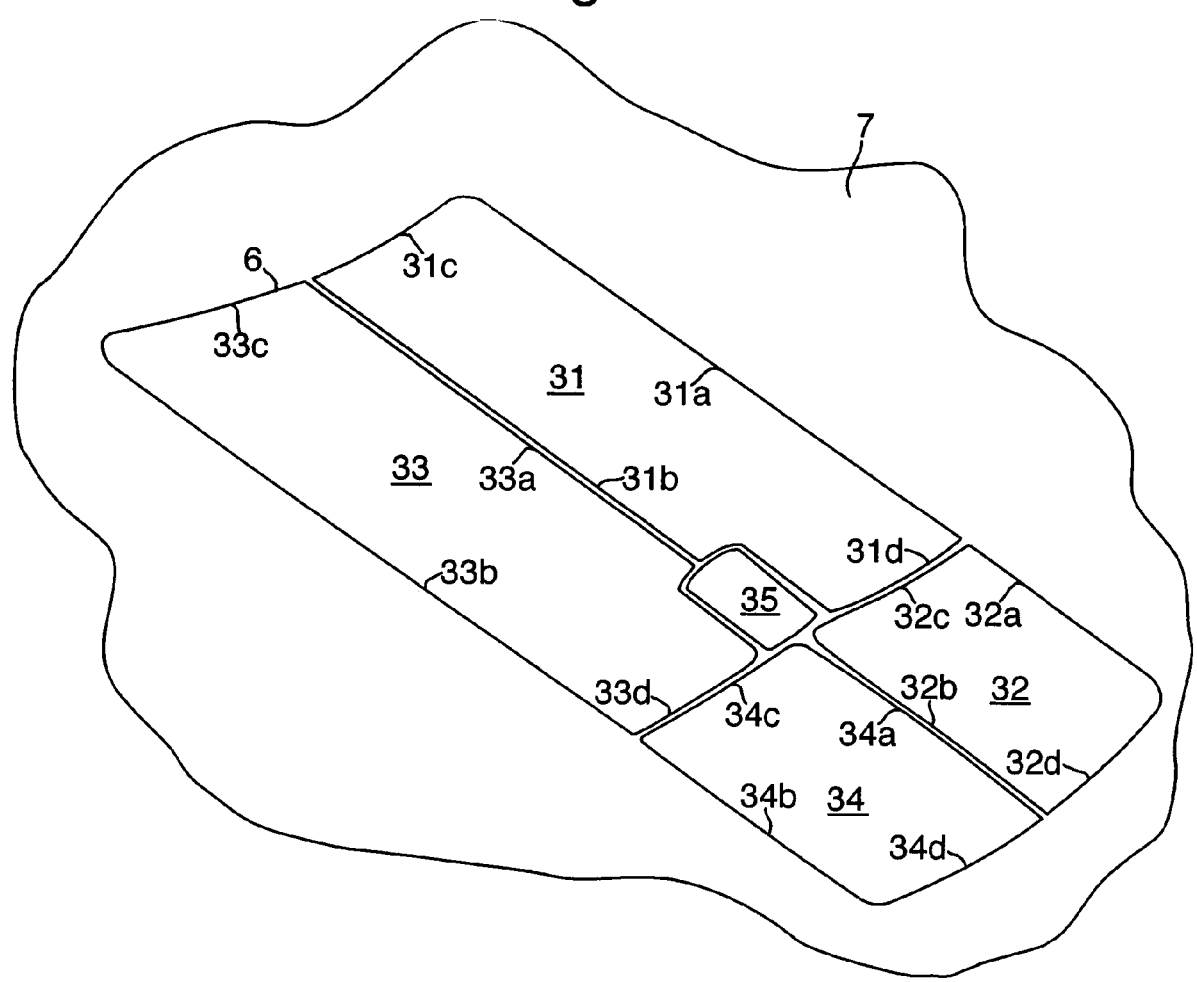
Figure 10:
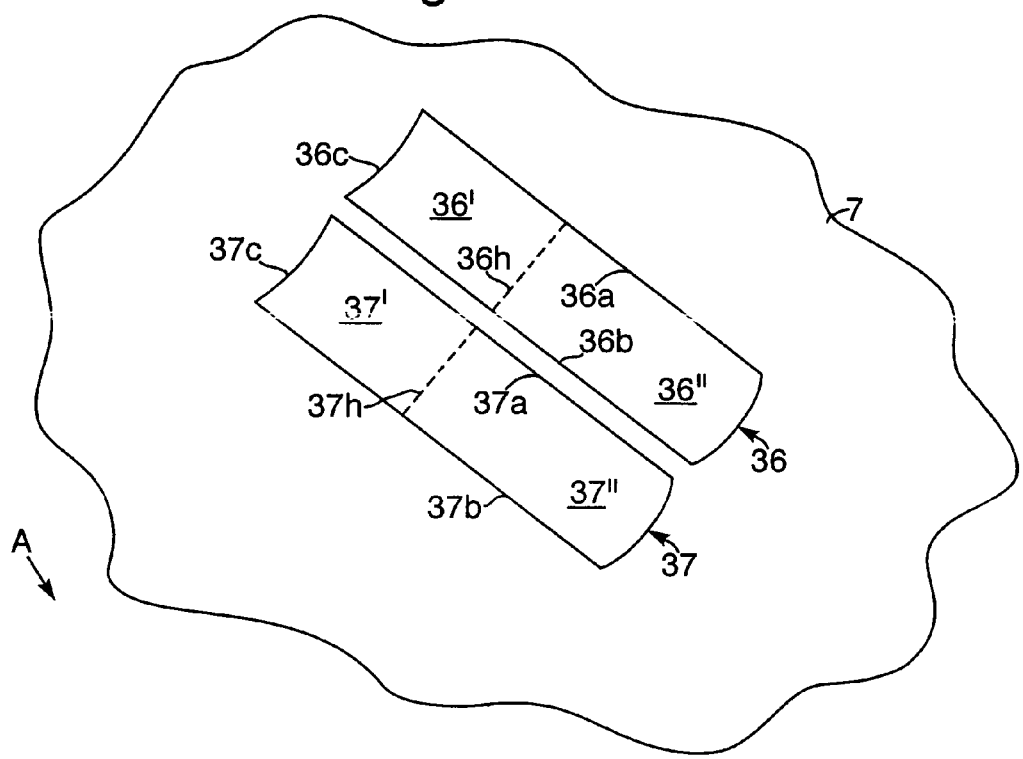
Figure 11:
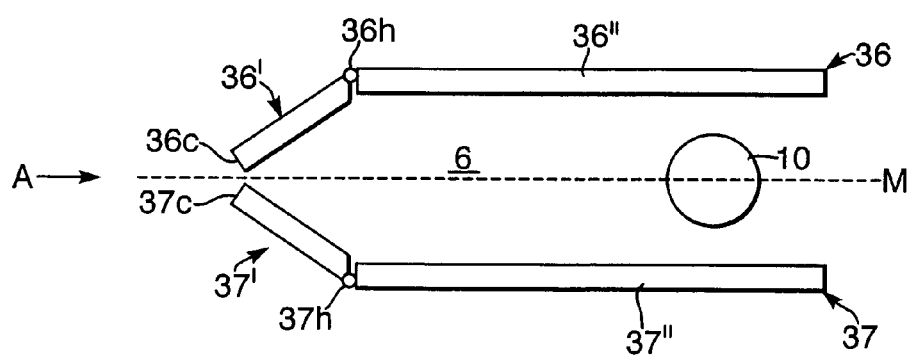
Figure 12:
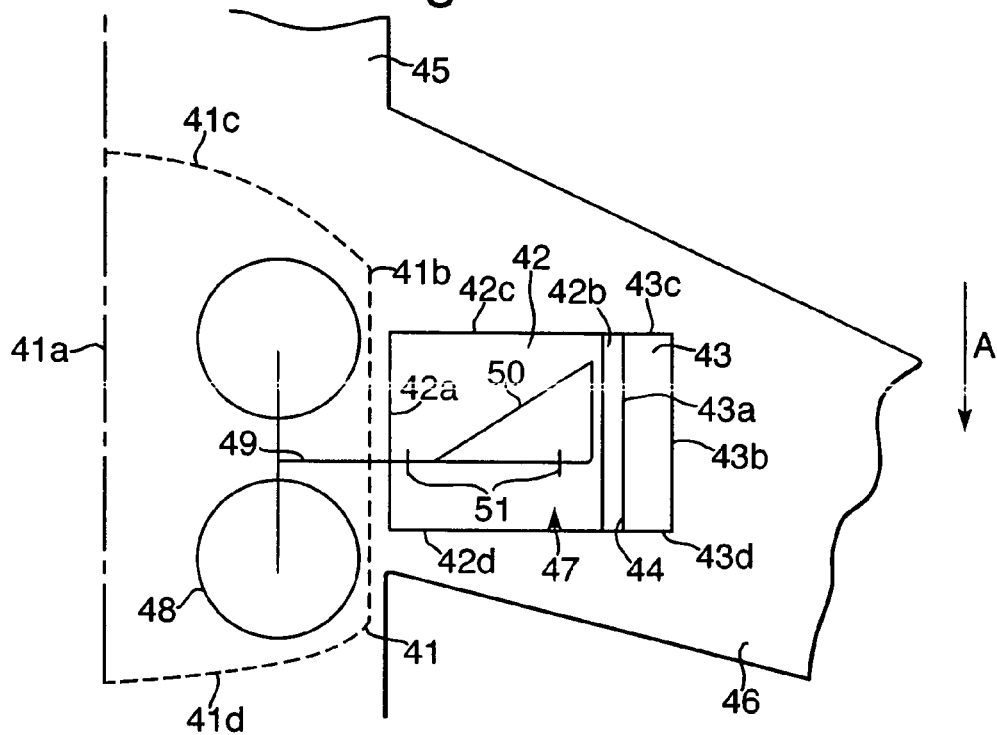
Figure 13:
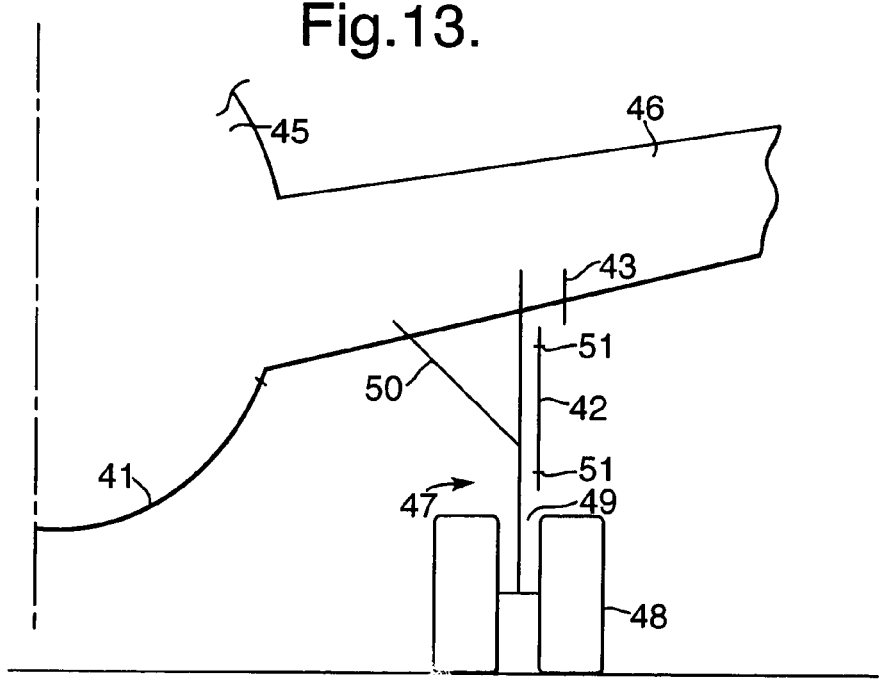
Figure 14:
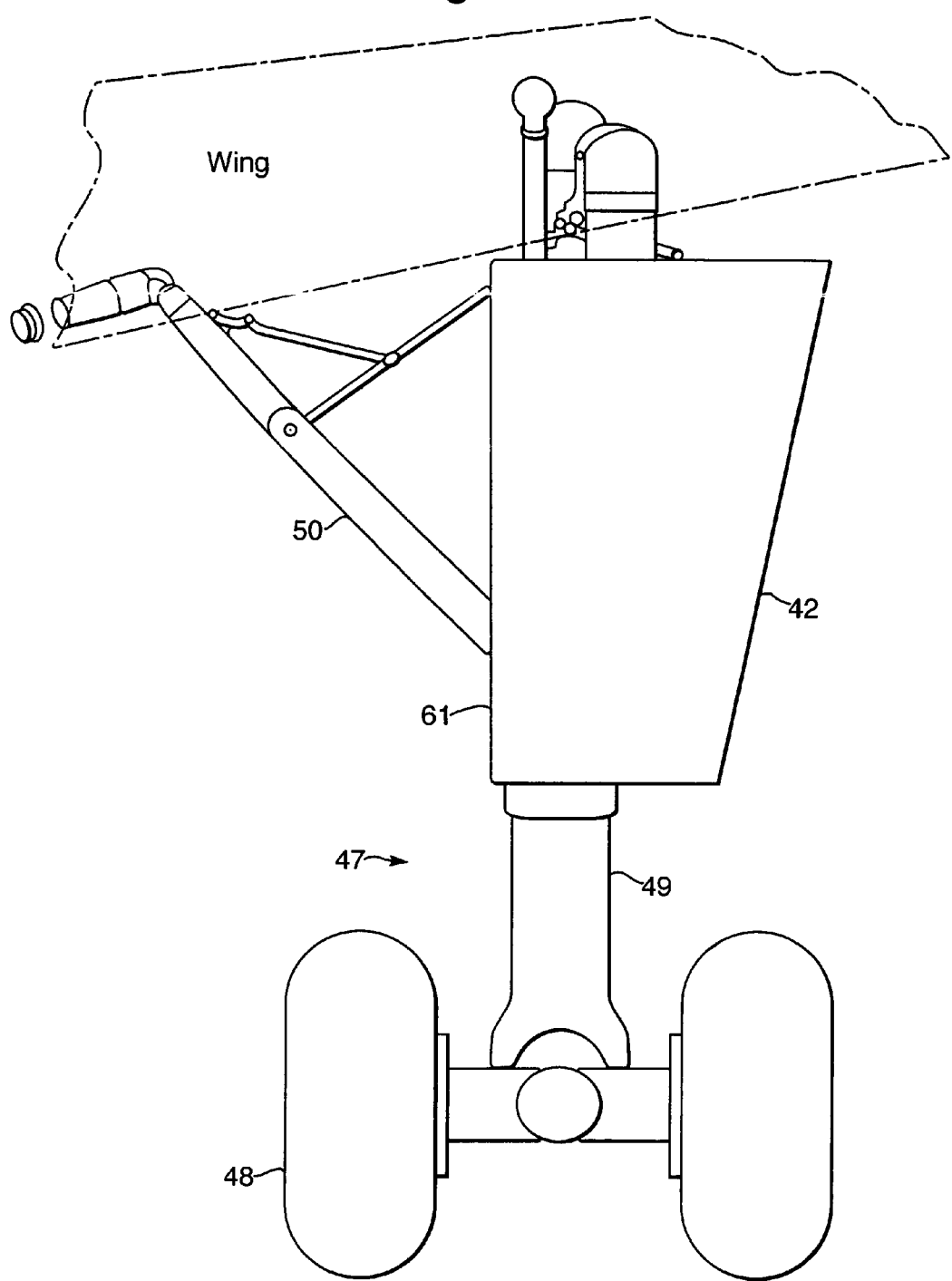
Figure 15:
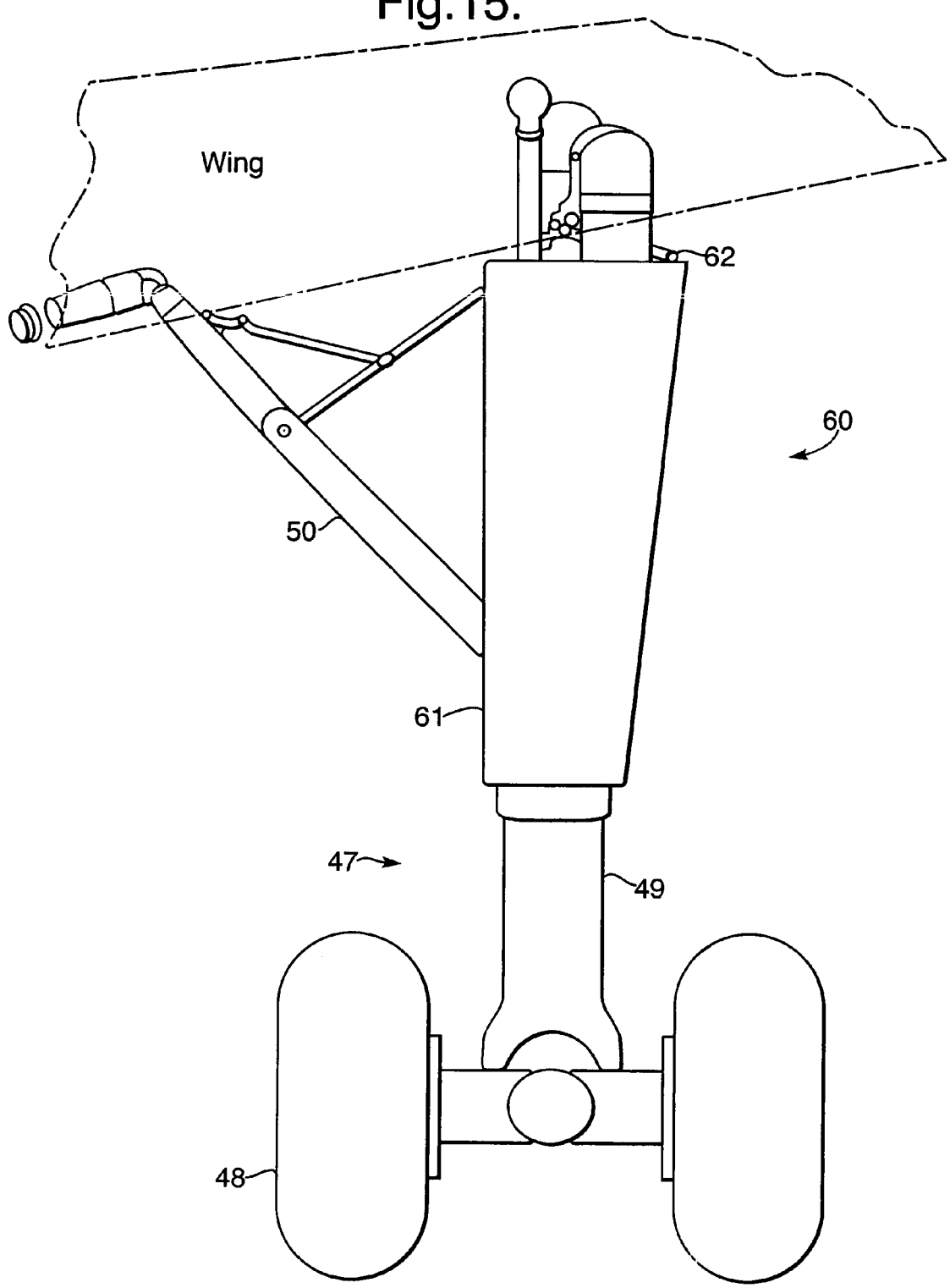
Figure 16:
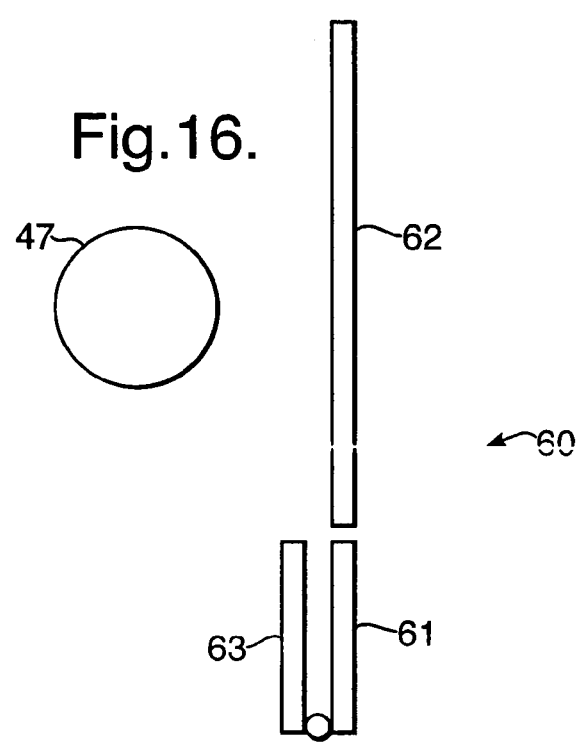
Figure 17:
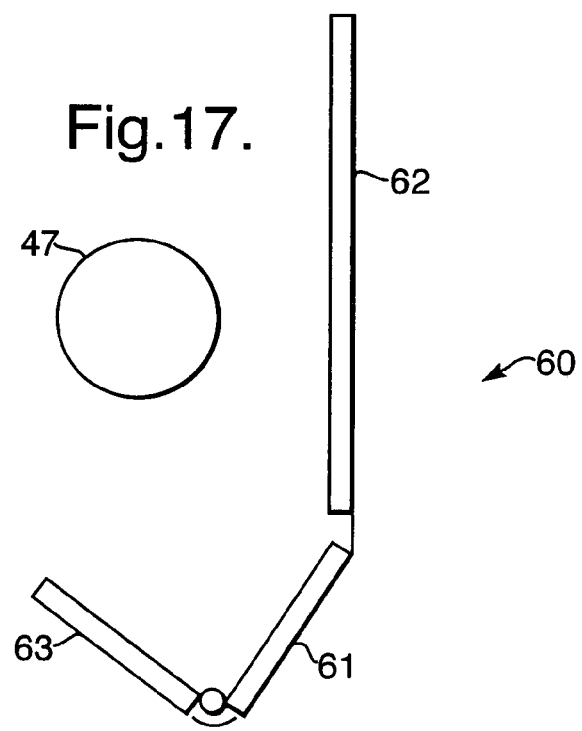
Figure 18:
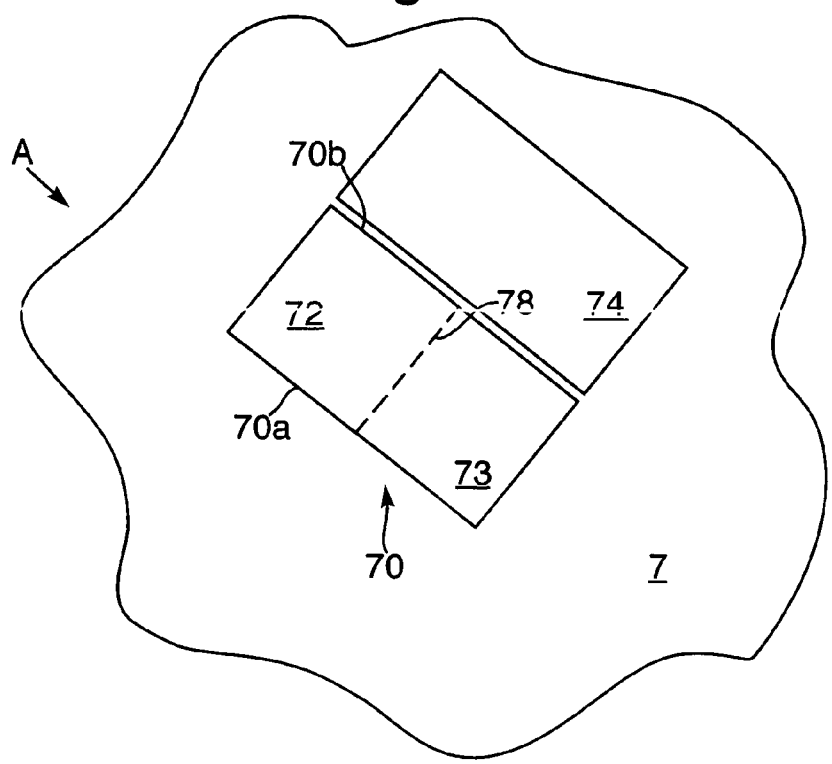
Figure 19:
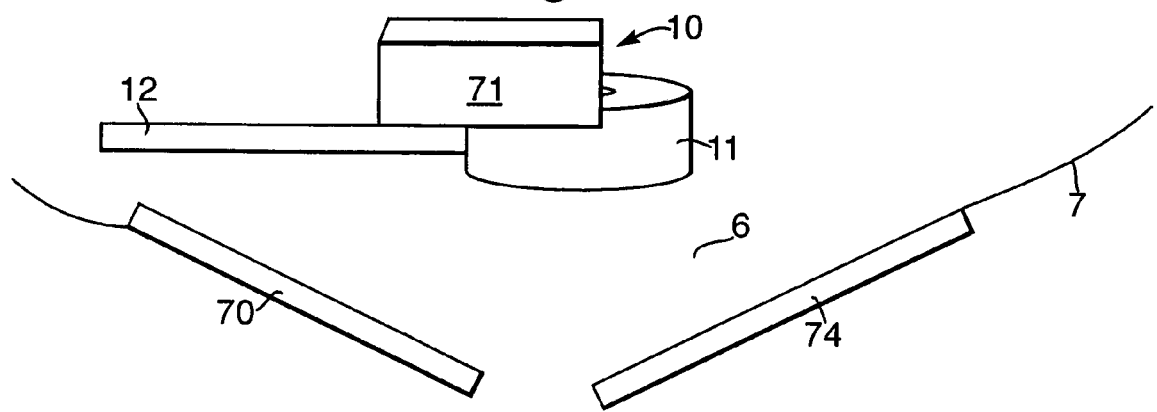
Figure 20:
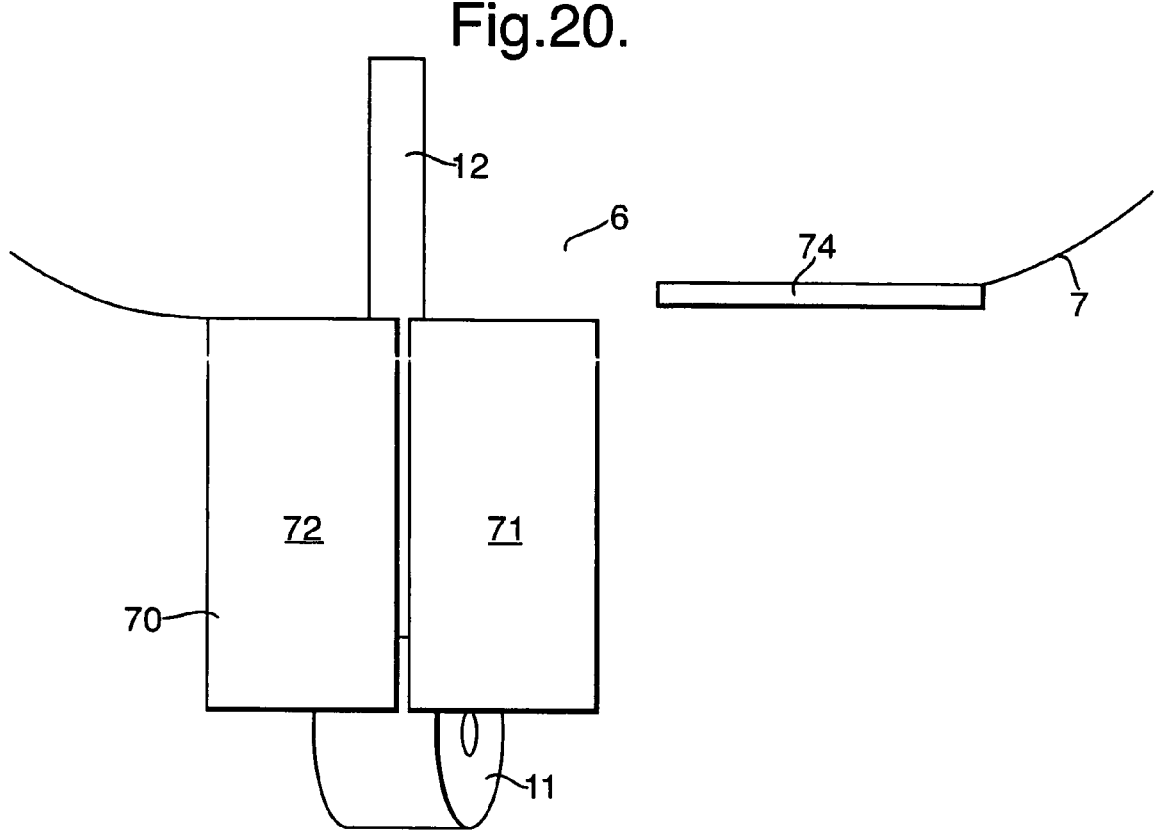
Figure 21:
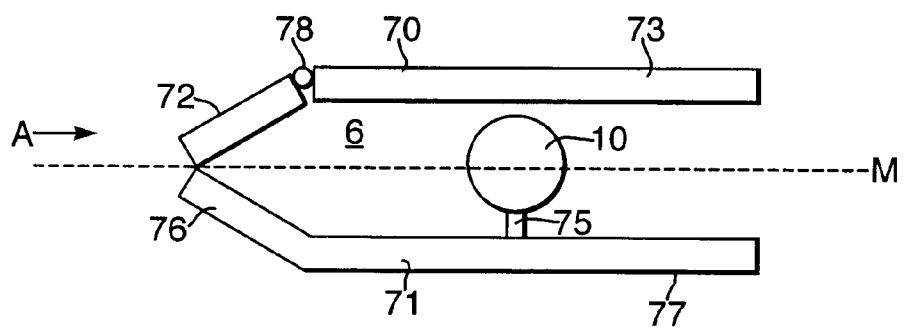

By way of example certain embodiments of the invention will now be described with reference to the accompanying schematic drawings, of which:

FIG. 1 is a perspective view from below, according to a first embodiment of the invention, of a portion of an aircraft nose landing gear door assembly with the doors shown all being closed, FIG. 2 is a perspective view from below, according to the first embodiment of the invention, of a portion of an aircraft nose landing gear door assembly with the landing gear deployed and all the doors open, FIG. 3 is a perspective view from below, according to the first embodiment of the invention, of a portion of an aircraft nose landing gear door assembly with the landing gear deployed, the fore doors closed and the aft doors open, FIG. 4 is a perspective view from below, according to the first embodiment of the invention, of a portion of an aircraft nose landing gear door assembly with the landing gear deployed, the fore doors positioned to act as fairings and the aft doors open, FIG. 5 is a perspective view from above, according to the first embodiment of the invention, of a portion of an aircraft nose landing gear door assembly showing the mounting arrangements for the doors, FIG. 6 is a perspective view from above, according to a second embodiment of the invention, of a portion of an aircraft nose landing gear door assembly with an alternative mounting arrangement for the doors, FIG. 7 is a perspective view from below, according to a third embodiment of the invention, of a portion of an aircraft nose landing gear door assembly with all the doors shown closed, FIG. 8 is a plan view, according to the third embodiment of the invention, of a portion of an aircraft nose landing gear door assembly in the open position, FIG. 9 is a plan view, according to the third embodiment of the invention, of a portion of an aircraft nose landing gear door assembly in a fairing position, FIG. 10 is a perspective view from below, according to a fourth embodiment of the invention, of a portion of an aircraft nose landing gear door assembly with both doors shown closed, FIG. 11 is a plan view, according to the fourth embodiment of the invention, of a portion of an aircraft nose landing gear door assembly in a faired open position, FIG. 12 is a plan view, according to a fifth embodiment of the invention, of a portion of an aircraft main landing gear door assembly in the closed position, FIG. 13 is a sectional view, according to a fifth embodiment of the invention, of a portion of an aircraft main landing gear door assembly in the open position, FIG. 14 is a perspective view from the front, according to the fifth embodiment of the invention, of a portion of the main landing gear door assembly in a faired open position, FIG. 15 is a perspective view from the front, according to a sixth embodiment of the invention, of a portion of the main landing gear door assembly in an alternative faired open position, FIG. 16 is a plan view, according to a seventh embodiment of the invention, of a portion of an aircraft main landing gear door assembly in the open position, FIG. 17 is a plan view, according to the seventh embodiment of the invention, of a portion of an aircraft main landing gear door assembly in a faired open position, FIG. 18 is a perspective view from below, according to an eighth embodiment of the invention, of an aircraft main landing gear door assembly in a closed position, FIG. 19 is a sectional view, according to the eighth embodiment of the invention, of a main landing gear door assembly moving from the closed position to an open position, the nose landing gear assembly moving from a stowed position, FIG. 20 is a front sectional view, according to the eighth embodiment of the invention, of the main landing gear door assembly in a faired open position, and FIG. 21 is a plan view, according to the eighth embodiment of the invention, of the main landing gear door assembly in the position shown in FIG. 20.

The doors of the door assemblies of the embodiments described herein are movable between a closed position, in which the doors are closed across an aperture, an open position, in which the doors are open to allow landing gear to be deployed through an aperture, and a further position, hereinafter described as the fairing position, in which at least a part of one of the doors acts as a fairing to divert airflow from the landing gear or a part thereof and thereby reduce the noise caused by interaction of the airflow with the landing gear, or a part thereof.

For each embodiment of the invention described, the structure and operation of the door assembly will be described by referring firstly to the doors, the axes about which they are arranged to rotate and the positions they occupy in the open, closed and fairing positions. Thereafter the mountings and linkages that achieve the desired movements will be described.

FIGS. 1 to 5 illustrate a first 'ramp' type embodiment of the invention as applied to an aircraft nose landing gear.

The door assembly shown in FIGS. 1 to 5 includes five doors: a first door 1, a second door 2, a third door 3, a fourth door 4 and a fifth door 5.

Referring to FIG. 1, the doors 1 to 5 are shown in their closed positions across an aperture 6 in an aircraft skin 7. The direction of flow of air relative to the door assembly is indicated by arrow A which points to the right in FIG. 1, since the aircraft is moving to the left.

It may be seen that the first door 1 and third door 3 are substantially rectangular in shape but that each has a smaller rectangular shaped section missing from one corner. The first door 1 is bounded by outer 1a and inner 1b longitudinal edges and fore 1c and aft 1d transverse edges. The cut out section of the first door 1 is missing from the corner that would have been formed by the longitudinal inner edge 1b and the transverse aft edge 1d. The third door 3 is of similar length and width to the first door and is bounded by inner 3a and outer 3b longitudinal edges and fore 3c and aft 3d transverse edges. Again, there is a cut out section of the third door, the cut out being at the corner that would have been formed by the longitudinal inner edge 3a and the transverse aft edge 3d. The fifth door 5 is substantially rectangular in shape and lies within the space formed by the two cut out sections. The second 2 and fourth 4 doors are rectangular in shape and are of much shorter length than the doors 1 and 3 and are of a narrower width. They are each bounded by outer and inner longitudinal edges, 2a, 4b, 2b, 4a respectively, and fore and aft edges, 2c, 4c, 2d, 4d respectively.

The first door 1 is mounted for fixed-axis rotation about a first longitudinal axis, disposed at a position adjacent to a first longitudinal edge of the aperture 6 and parallel to the longitudinal length of the aircraft, and for fixed-axis rotation about a transverse axis, disposed at a position adjacent to the fore transverse edge of the aperture 6. The second 2 door is mounted with only one degree of freedom. The second door 2 is mounted for fixed-axis rotation only about a second longitudinal axis that is parallel to, but spaced inwardly of, the first longitudinal axis. The third and fourth doors 3, 4 are mounted for movement in a symmetrical manner to the first and second doors 1, 2. Thus, the third door 3 is mounted for fixed-axis rotation about a third longitudinal axis, disposed at a position adjacent to a second longitudinal edge (on the opposite side of the aperture to the first longitudinal edge) of the aperture and parallel to the longitudinal length of the aircraft and, about the transverse axis (the same transverse axis as mentioned above in relation to the first door). Also, the fourth door 4 is mounted only for fixed-axis rotation about a fourth longitudinal axis parallel to, but spaced inwardly of, the second longitudinal axis.

In the embodiment described herein the first door 1 is arranged to rotate about only one axis at a time. Similarly, the third door 3 is arranged to rotate about only one axis at a time. Thus, the doors 1 and 3 are able to rotate from their closed positions of FIG. 1 either to their open positions of FIG. 2 by rotating about their respective longitudinal axes of rotation or to their fairing position of FIG. 4 by rotating about the transverse axis.

The fifth door 5 is fixed to the landing gear (not shown) and therefore rotates about the same axis as the landing gear.

In the closed position, as shown in FIG. 1, the doors 1 to 5 are positioned across and cover the generally oblong shaped aperture 6 in the aircraft skin 7. The inner side edges 1b and 2b of the first and second doors lie immediately adjacent to the inner side edges 3a and 4a of the third and fourth doors and the transverse aft edges 1d and 3d of the first and third doors lie immediately adjacent to the transverse fore edges 2c and 4c of the second and fourth doors. The fifth door 5 lies within the space formed by the two missing corner sections of the first and third doors. The aft transverse edge 5d of the fifth door lies immediately adjacent to a portion of the fore transverse edge 2c of the second door and to a portion of the fore transverse edge 4c of the fourth door.

Referring to FIG. 2, the door assembly is shown in its open position with the nose landing gear 10 in its deployed position. The nose landing gear 10 includes wheels 11, a central support column 12 (or leg) and a drag stay 13. The doors 1 to 4 are positioned with their outer longitudinal edges 1a, 2a, 3b, and 4b parallel and adjacent to the longitudinal edges of the aperture and with their transverse fore and aft edges 1c, 1d, 2c, 2d, 3c, 3d, 4c, 4d extending substantially downwards from the aircraft. The fifth door 5 (hidden from view in FIG. 2) is fixed to the landing gear and therefore moves with the landing gear 10 to a substantially vertical position.

Between the open and fairing positions, the door assembly moves through a semi-closed position as shown in FIG. 3. In this position, the landing gear 10 is in its fully deployed position, the first and third doors 1, 3 are in their closed positions and the second and fourth doors 2, 4 are in their open positions.

In the fairing position, as shown in FIG. 4, the doors 1 and 3 act as 'ramp' type fairings extending from the fore edge of the aperture 6, in a direction both downwards and towards the landing gear 10. The doors 1 and 3 are positioned with their inner longitudinal edges 1b and 3a lying adjacent to each other and with their transverse fore edges 1c and 3c parallel and adjacent to the fore transverse edge of the aperture 6. The longitudinal edges 1a, 1b, 3a and 3b extend diagonally downwards. When in the fairing position, the angle α of separation between the longitudinal edges of the aperture and the longitudinal edges of the doors 1 and 3 is normally in the range of 10 degrees to 45 degrees. The particular position to which the doors 1 and 3 are moved depends on many factors, for example, the extent to which the landing gear may be shielded by the doors, and can be controlled by an operator of the aircraft. In the fairing position the doors 2 and 4 remain in their open positions, namely, with their longitudinal edges 2a, and 4b parallel and adjacent to the longitudinal edges of the aperture and with their transverse edges 2c, 2d, 4c and 4d extending substantially downwards from the aircraft. As the fore doors 1 and 3 are wider than the aft doors 2 and 4, when in the faired open position the first and third doors 1 and 3 shield the second and fourth doors 2 and 4 (see FIG. 1 for example). The fifth door 5 remains in its open position when the first and third doors 1, 3 are in the faired open position.

Having now described the doors, the axes about which they rotate and the positions that they adopt in the closed, open and fairing positions, the details concerning the mounting of the doors will be described.

Referring to FIG. 5, the first and third doors 1, 3 each have two transverse crank arms 14, each arranged to be couplable to, and decouplable from, the inside face of the door, the crank arms 14 being positioned at equispaced intervals along and adjacent to the transverse fore edges 1c, 3c of the doors. The opposite ends of the crank arms 14 are rotatably connected to a mounting (not shown) which is fixed to the aircraft structure 7 (only partially shown) inside the landing gear bay. The transverse crank arms 14 are connected such that they are rotatable about an axis parallel to the transverse edge of the aperture.

The first and third doors are also each provided with two longitudinal crank arms 15, each arranged to be couplable to, and decouplable from, the inside face of the door, at spaced apart positions adjacent to the outer longitudinal edge 1a, 3a of each door 1, 3, respectively. The opposite ends of the crank arms 15 are rotatably connected to a mounting (not shown) which is fixed to the aircraft structure 7 (only partially shown) inside the landing gear bay. The longitudinal crank arms 15 of each door are connected such that each door is rotatable about an axis parallel and adjacent to the longitudinal edge of the nearest side of the aperture 6 (the first and third longitudinal axes mentioned above).

Thus by coupling transverse crank arms 14 and decoupling longitudinal crank arms 15, the doors 1 and 3 can be rotated about an axis parallel to the transverse edge of the aperture 6, and by coupling longitudinal crank arms 15 and decoupling transverse crank arms 14, the doors 1 and 3 can be rotated about their respective longitudinal axis of rotation.

The second door 2 has two longitudinal crank arms 16, which at one end are each fixed to the inside face of the door at spaced-apart positions adjacent to the door's outer longitudinal edge 2a, and at their other ends are rotatably connected, by means of a connection (not shown), to a mounting (also not shown) which is fixed to the aircraft structure 7 inside the landing gear bay. The rotatable connections (not shown) enable the second door 2 to rotate about the second longitudinal axis (parallel and adjacent to the first longitudinal axis about which the first door 1 is able to rotate).

The fourth door 4 is mounted in a similar manner to that of the second door 2. Thus, the fourth door 4 is mounted for rotation about the fourth longitudinal axis, parallel and adjacent to the second longitudinal edge of the aperture 6 (parallel and adjacent to the second longitudinal axis about which the second door 2 is able to rotate), by means of two longitudinal crank arms 16 fixed to the inside face of the door and rotatably connected at connections (not shown) to the aircraft structure 7.

Thus the doors 2 and 4 can each be rotated about their respective axes parallel to the longitudinal edges of the aperture.

The fifth door 5 is fixed to the landing gear assembly 10 and is therefore mounted for rotation with the landing gear 10 about a generally transverse axis.

During normal usage it is not possible for a door to be simultaneously decoupled from all of the crank arms 14, 15, 16.

The movement of the doors 1, 2, 3, 4, 5 from their closed positions to their open positions is effected by one linkage connected to all the doors so that their movement is simultaneous. The movement of the first and third doors 1 and 3 from their open positions to their fairing positions is also effected by one linkage connected to both doors so that their movement is simultaneous.

Hydraulic actuators are provided for controlling movement of the doors, for controlling the locking of the first and third doors 1 and 3 in their fairing positions and, for controlling the locking of the second and fourth doors 2 and 4 in their open positions.

As the skilled person will appreciate, there are various linkage and actuator arrangements that could be used to offer the same result.

The operation of the doors will now be described with reference to FIGS. 1 to 4.

During normal flight, the doors 1 to 5 are in their closed position as shown in FIG. 1, with the landing gear stowed in the landing gear bay.

During approach of the aircraft when landing, the first to fourth doors 1 to 4 are opened by rotating them through 90 degrees about their longitudinal axes (the axes being parallel to the longitudinal edges of the aperture 6) to the position shown in FIG. 2. As the landing gear 10 deploys, the fifth door 5 moves with the landing gear (and therefore moves from its closed position to its open position) and the first to fourth doors 1 to 4 move from their closed positions towards their open positions, thereby revealing the whole of the aperture 6 open and allowing the landing gear to pass through it. When the landing gear 10 is fully deployed, only a small area of the aperture 6 is filled with the landing gear (an area that in the closed position would be covered by the second, fourth and fifth doors 2, 4). The second and fourth doors 2, 4 would, if otherwise able to do so, be unable to move from the open position to the closed position because their movement would be obstructed by the deployed landing gear 10.

Once the landing gear 10 has been deployed, the landing gear 10 and second and fourth doors 2, 4 are locked in position. The first and third doors 1, 3 are then rotated back through 90 degrees into the closed position (as shown in FIG. 3) about the first and third longitudinal axes, respectively. Then, while in the closed position, the first and third doors 1, 3 are coupled to the transverse crank arms 14 and then de-coupled from the longitudinal crank arms 15. The first and third doors 1, 3 are then moved, together as a unit, into the fairing position by rotating them by 30 degrees about the axis parallel to the transverse fore edge of the aperture 6 into the position shown in FIG. 4.

In this position the first and third doors act as a 'ramp' type fairing, diverting the airflow substantially downwards, thereby shielding the upper part of the landing gear 10 and the second and fourth doors 2, 4. The amount of landing gear shielded depends on the angle at which the doors are positioned to extend from the aircraft skin.

The first and third doors 1 and 3 remain in the fairing position throughout approach and landing of the aircraft. On take-off the doors 1 and 3 are moved back to their closed position, firstly to reduce drag and secondly because the noise generated during take-off by the engines is so great that the benefit of reducing noise by means of the ramp type fairing would not be significant. Before take off (while the landing gear is still deployed), the doors 1 and 3 are therefore rotated back through 30 degrees returning them to their closed position (to a position much like that as shown in FIG. 3). While in the closed position, the first and third doors 1, 3 are coupled to the longitudinal crank arms 15 and are de-coupled from the transverse crank arms 14. In contrast, the second and fourth doors 2 and 4 remain open while the aircraft lands and, in due course, takes off again. After take-off when the landing gear needs to be stowed again, the first and third doors 1 and 3 are rotated through 90 degrees about the first and third longitudinal axes to the position shown in FIG. 2. The landing gear (and attached fifth door 5) are then retracted through the whole of the aperture 6 and, then, the doors 1 to 4 are closed, by simultaneous rotation of the first and second doors 1, 2 and the third and fourth doors 3, 4 about their respective longitudinal axes of rotation, respectively.

FIG. 6 illustrates a second embodiment similar to the first 'ramp' type fairing embodiment described above, but having a different mounting arrangement for moving the doors 1 and 3 between their closed, open and fairing positions.

The door assembly includes the five doors 1, 2, 3, 4, 5 as described previously, but all being of the same width, and a rotatable U-shaped frame 20 to which the doors 1 and 3 are rotatably attached. The frame 20 comprises a base 21, a first arm 22a extending at right angles from one end of the base 21 and, a second arm 22b, parallel to the first arm 22a, extending at right angles from the opposite end of the base 21. The aperture 6 in this second embodiment also has a fore portion that is wider from an aft portion. The size, configuration and operations of the second, fourth and fifth doors 2, 4, 5 are substantially the same as that described above with reference to the first embodiment.

The frame 20 in its closed position covers a part of the aperture 6 and its outside surface is flush with the exterior of the aircraft. The frame 20 is rotatably mounted on transverse crank arms 23 for fixed-axis rotation about an axis parallel and adjacent to the transverse fore edge of the aperture 6. Each of the transverse crank arms 23 is at one end connected to the inside face of the base 21 of the frame 20 at spaced apart positions and is at the other end rotatably mounted at a connection 24 to the aircraft structure 7 inside the landing gear bay. The rotatable connections 24 all lie on an axis of rotation parallel and adjacent to the transverse fore edge of the aperture 6.

In a manner similar to that described above with reference to the first embodiment, the first door 1 is mounted for rotation, about an axis parallel to the longitudinal edge of the aperture 6, by means of longitudinal crank arms (not shown) each fixed at one end to the door and rotatably mounted at the other end to the first arm 22a of the frame 20. The third door 3 is similarly rotatably mounted to the second arm 22b of the frame 20 for fixed axis rotation about a parallel axis. Thus by rotating the doors 1 and 3 downwards about their longitudinal axes of rotation whilst holding the frame 20 in its closed position, the first and third doors 1, 3 can be moved from their closed positions, shown in FIG. 6, to their open positions (not shown). With the first and third doors 1, 3 in their closed position, rotation of the frame 20, together with the first and third doors 1, 3 (that move with the frame as a unit), downwards about the transverse axis of rotation moves the doors 1 and 3 and the surrounding frame 20 together to form a ramped type fairing.

FIGS. 7 to 9 illustrate a third V-shaped fairing embodiment of the invention as applied to an aircraft nose landing gear. The nose landing gear door assembly shown in FIGS. 7 to 9 includes five doors: a first door 31, a second door 32, a third door 33, a fourth door 34 and a fifth door 35.

The second door 32, fourth door 34 and fifth door 35 of this embodiment correspond to the second 2, fourth 4 and fifth 5 doors described previously in relation to the first and second embodiments and operate in the same way as described above. The first and third doors 31, 33 are shaped identically to the first and third doors as described above with reference to the first and second embodiments, and move between their open and closed positions in a similar manner, but move to a different fairing position and by means of a different mechanism, these differences being described in further detail below.

Thus the first door 31 is substantially rectangular in shape and is bounded by outer 31a and inner 31b longitudinal edges and by fore 31c and aft 31d transverse edges and similarly the third door 33 is bounded by longitudinal inner and outer edges 33a and 33b and by fore and aft edges 33c and 33d. Also, the first and third doors 31, 33 are each mounted for fixed-axis rotation about first and second longitudinal axes, disposed at a location adjacent to the opposite longitudinal edges of the aperture 6, respectively. The first and third doors 31, 33 are however also mounted for rotation about respective axes that are substantially vertical, when the doors are in the open position.

In the closed position, as shown in FIG. 7, the doors 31 to 35 are positioned across and cover the rectangular shaped aperture 6 in the aircraft skin 7. FIG. 8 shows a schematic plan view of the door assembly in its open position and with the nose landing gear 10 in its deployed position. The nose landing gear 10 includes wheels 11 (not shown in FIG. 8), a central support column 12 (or leg) and a drag stay 13 (not shown in FIG. 8). The relative arrangements of the doors in their open and closed positions are as described with reference to the first embodiment.

FIG. 9 shows a schematic plan view of the door assembly with the first and third doors 31, 33 in the fairing position, in which the first 31 and third 33 doors are positioned to divert the airflow away from an upper portion of the landing gear. The first door 31 is positioned with its transverse edges 31c and 31d extending substantially downwards from the aircraft and with its longitudinal edges 31a and 31b extending (as viewed from above) diagonally in the direction from the mid point of the fore transverse edge of the aperture 6 to a point on the first longitudinal edge of the aperture 6 (the edge nearest the first door 31). The third door 33 mirrors the position of the first door 31, so that its transverse edges 32c and 32d extending substantially downwards from the aircraft and its longitudinal edges 32a and 32b extend diagonally from the mid point of the fore transverse edge of the aperture to a point on the second longitudinal edge of the aperture (the edge nearest the second door 31). Thus, the first and third doors 31, 33 form a V-shaped fairing (as viewed from above) in front of the landing gear 10. The second, fourth and fifth doors 32, 34, 35 remain in their open positions.

The mechanisms provided to effect the movement of the second, fourth and fifth doors 32, 34, 35 are identical to the mechanisms described above with reference to the first embodiment. The mechanisms provided to effect the movement of the first and third doors 1, 3, are of course different. In this embodiment, the first door 31 is mounted for longitudinal rotation about a single arm mounted at one end on the aircraft structure on a rotatable connection having its axis of rotation parallel and adjacent to the longitudinal edge of the side of the aperture 6. The other end of the arm is rotatably mounted on the door, so that the door is rotatable about an axis that is substantially parallel to the face of the door and transverse to the longitudinal axis of the aircraft. Thus, when the first door 1 is in its open position, the door 1 is able to rotate about a substantially vertical axis. The third door is similarly mounted. Of course, any suitable mechanism for providing both rotation about a longitudinal axis and rotation about a vertical axis when the doors 1, 3, are in their open positions may be provided.

Thus, the first and third doors 31 and 33 are able to rotate downwardly from the closed positions shown in FIG. 7 through an angle of about 90 degrees to the open positions shown in FIG. 8 and then, by causing rotation about a vertical axes of the first and third doors 1, 3 relative to the respective crank arms (not shown) that couple the doors to the aircraft through an angle of about 45 degrees, the first and third doors 31 and 33 are moved to their fairing positions, as shown in FIG. 9.

Hydraulic actuators are provided for controlling movement of the doors, for controlling movement of the crank arms relative to the doors that provide the vertical rotation, and for controlling the locking of the doors in their open, closed and fairing positions. Also, breakable couplings are provided between the doors to facilitate movement of the first 31 and second 32 doors together as a unit.

During normal flight, the first to fifth doors 31 to 35 are in their closed positions (as shown in FIG. 7), with the landing gear stowed in the landing gear bay and during approach of the aircraft when landing, the first to fifth doors 31 to 35 are opened and the landing gear deploys, in a manner similar to that described above with reference to the first embodiment. Once the landing gear has been deployed, the landing gear 10 and the second 32 and fourth doors 34 are locked into position. The first and third 31 and 33 doors are then each rotated about a respective vertical axis through about 30 degrees into the fairing position (the doors being rotated towards each other). In the fairing position shown in FIG. 9, the fore transverse edge of the first door 31 meets the fore transverse edge of the third door 33 to form a point, the fairing thereby formed being substantially V-shaped when viewed from above. Thus, in this position the first and third doors 31 and 33 act as a V-shaped fairing, diverting the airflow away from the upper portion of the landing gear, by diverting the air in substantially horizontal directions.

As described above with reference to the first embodiment, the first and second doors 31 and 33 remain in the fairing position throughout approach and landing of the aircraft, but before take-off they are moved back to their closed position. The second, fourth and fifth doors 2, 4, 5 remain in their open positions throughout landing and subsequent take-off. After take-off, when the landing gear needs to be stowed again, the first and third doors 31 and 33 are rotated through 90 degrees about axes parallel to the longitudinal edge of the aperture to the position shown in FIG. 8, and the landing gear 10 (and attached fifth door 5) is then retracted through the whole of the aperture 6 and, whilst the all five doors 31 to 35 move from their open positions to their closed positions.

FIGS. 10 and 11 illustrate a fourth embodiment of the invention similar to the V-shaped fairing embodiment of FIGS. 7 to 9. The nose landing gear door assembly shown in FIGS. 10 and 11 includes a first and a second door 36, 37 both of which have two portions.

The first door 36 has a fore portion 36' (or panel section) and an aft portion 36". Similarly the second door 37 has a fore portion 37' (or panel section) and an aft portion 37". The first and second doors are substantially rectangular in shape and are mounted for fixed-axis rotation about respective first and second longitudinal axes, each disposed at a location adjacent to the longitudinal outer edges 36a and 37b of the doors, respectively.

In the closed position, as shown in FIG. 10, the doors 36 and 37 are positioned across and cover the rectangular shaped aperture 6 in the aircraft skin 7.

FIG. 11 shows a schematic plan view of the door assembly in the open and faired position and with the nose landing gear 10 in the deployed position. The doors 36, 37 have undergone rotation firstly by approximately 90° about the longitudinal axes so the transverse edges 36c, 37c extend substantially downwards from the aircraft. Secondly, the fore portions 36' and 37' of the first and second doors 36, 37 have rotated to a position in which the airflow A is diverted away from the upper portion of the landing gear 10. The fore portions 36', 37' of the first and second doors 36, 37 are positioned so that the transverse edges 36c, 37c are directly adjacent to each other and positioned in the region of the mid-line M of the aperture 6. When in the open faired position, the fore portions 36', 37', when viewed from above, extend diagonally from the midline M of the aperture 6 to the longitudinal edges of the aperture 6 and the aft portions 36", 37" of the doors 36, 37 extend along the longitudinal edges of the aperture 6 and are substantially parallel to each other. The fore portions 36', 37' of the first and second doors 36, 37 form a V-shaped fairing (as viewed from above) in front of the landing gear 10.

The mechanism provided to effect movement of the first and second doors 36, 37 from the closed position to the open faired position as shown in FIG. 11 will now be described.

The movement of the fore portions 36', 37' of the doors to the fairing position starts before the aft portions 36", 37" of the doors reach their fully open position. The doors 36, 37 are each mounted for longitudinal rotation about axes parallel and adjacent to the longitudinal edges of the aperture 6 (in a manner similar to that described with reference to the first and third doors of the first embodiment) by means of arms (not shown) mounted on the aircraft structure 7 and rotatably connected to the aft portions 36", 37" of the doors 36, 37. The fore portions 36' and 37' of the doors are rotatably connected to the aft portions 36", 37" about respective hinge axes 36$h$, 37$h$. Each hinge axis 36$h$, 37$h$ is substantially parallel to the face of the door and is transverse to the longitudinal edges 36$a$, 37$b$ of the doors 36, 37. Thus there is provided (i) a mechanism to effect a first type of movement (rotational movement about longitudinal axes) to move aft portions 36" and 37" of the doors 36, 37 into an open position and (ii) a mechanism to effect a second type of movement (rotation about the transverse hinge axes 36$h$, 37$h$) to move the fore portions 36', 37' into a fairing position. A mechanism is provided to effect rotation about the hinge 36$h$, 37$h$ axes, during, but only towards the end of the movement of, the aft door portions 36", 37" from the closed position to the fully open position, to bring the fore portions 36', 37' of the doors 36, 37 into the fairing position as illustrated in FIG. 11. Thus, the doors 36, 37 proceed from the closed position shown in FIG. 10 directly to the fairing position shown in FIG. 11 without passing via an unfaired, but fully open position. Also, each fore portion 36', 37' of the doors 36, 37 may be considered as being moved in both a first and a second type of movement simultaneously.

FIGS. 12, 13 and 14 illustrate a fifth embodiment of the invention as applied to a main landing gear.

The main landing gear door assembly shown in FIGS. 12 to 14 includes three doors: a main door 41, a leg door 42 and a hinge door 43. The landing gear 47 includes wheels 48, a central support column 49 (or leg) and a drag stay 50.

Referring first to FIG. 12, the doors 41, 42 and 43 are shown in their closed positions across an aperture 44. The aperture 44 extends across the fuselage 45 and the wing 46 and is of a size to allow the main landing gear 47 to move from its retracted position to its deployed position. The aperture 44 comprises a fuselage portion and a wing portion. When the landing gear assembly is in its retracted position, the wheels 48 and a small portion of the leg 49 are positioned inside the fuselage while the drag stay 50 and the remaining portion of the leg 49 are positioned inside the wing 46. The fuselage portion of the aperture is therefore wider than the wing portion to allow the landing gear 47 to deploy.

The direction of flow of air relative to the door assembly is indicated by arrow A which points downwards in FIG. 12, since the aircraft is moving upwards.

The main door 41 is of the same curvature as the fuselage and is bounded by an inner substantially straight edge 41$a$, an outer substantially straight edge 41$b$, a curved fore edge 41$c$ and a curved aft edge 41$d$. The leg door 42 is substantially rectangular in shape and is bounded by an inner edge 42$a$, an outer edge 42$b$, a fore edge 42$c$ and an aft edge 42$d$. The hinge door 43 is substantially rectangular in shape and is bounded by an inner edge 43$a$, an outer edge 43$b$, a fore edge 43$c$ and an aft edge 43$d$. The inner edge of the hinge door 43$a$ is of substantially the same length as the outer edge of the leg door 42$b$.

The main door 41 is mounted for fixed-axis rotation about a first longitudinal axis that is parallel to the longitudinal length of the aircraft and is disposed at a position adjacent to the longitudinal edge of the fuselage portion of the aperture 44. The leg door 42 is rotatably mounted on the leg 49 for rotation about an axis parallel to the longitudinal length of the leg 49. The leg door 42 may therefore be rotated about the leg axis to move the leg door to a fairing position as described in further detail below. The leg door 42, being mounted on the leg 49, also rotates with the leg 49 as it deploys by rotating about a second longitudinal axis. The hinge door 43 is mounted for fixed-axis rotation about a third longitudinal axis. The third axis is disposed at a position adjacent to the longitudinal outer edge of the wing portion of the aperture 44 and is also parallel to the longitudinal length of the aircraft. The hinge door 43 is so arranged that it does not unduly obstruct the rotation of the leg door 42 about the axis parallel to the longitudinal length of the leg 49.

In the closed position, as shown in FIG. 12, the doors 41 to 43 are positioned across and cover the aperture 44 in the aircraft fuselage 45 and wing 46. The main door 41 lies with its inner edge 41$a$ immediately adjacent to the longitudinal edge of the fuselage portion of the aperture 44 and with a portion of its outer straight edge immediately adjacent to the inner edge 42$a$ of the leg door. The outer edge 42$b$ of the leg door lies immediately adjacent to the inner edge 43$a$ of the hinge door. The hinge door 43 lies with its outer edge 43$b$ immediately adjacent to the longitudinal edge of the wing portion of the aperture 44.

Referring to FIG. 13, the main landing gear 47 is shown in its deployed position. The main door 41, although required to be open during deployment of the landing gear 47, is closed once the gear 47 is deployed. The leg door 42 is fixed to the landing gear 47 and moves with the gear 47. Thus, the leg door 42 is positioned with its inner and outer edges 42$a$, 42$b$ parallel to the longitudinal length of the aircraft and with its transverse fore and aft edges 42$c$, 42$d$ extending substantially downwards parallel to the leg 49. The hinge door 43 is positioned with its inner and outer edges 43$a$, 43$b$ parallel to the longitudinal length of the aircraft and with its transverse fore and aft edges 43$c$, 43$d$ extending substantially downwards from the aircraft.

In the fairing position, as shown in FIG. 14, the leg door 42 has been rotated about the leg axis so that it is in a plane at an acute angle to the longitudinal axis of the aircraft. The whole leg door 42 thus acts as a fairing, diverting the airflow in a substantially horizontal direction away from noise generating parts of the upper portion of the main landing gear assembly 47. The leg door 42 is positioned with its fore and aft edges extending substantially downwards. The fore edge is positioned closer to the fuselage than the aft edge. Thus, the inner and outer edges 42$a$, 42$b$ extend diagonally in front of the landing gear leg 49. An angle β of separation is formed between the inner and outer edges 42$a$, 42$b$ of the aperture 44 and an axis parallel to the longitudinal length of the aircraft. When in the fairing position, the angle β is normally in the range of 10 degrees to 45 degrees. The particular position to which the leg door 42 is moved depends on many factors, for example, the extent to which the landing gear is required to be shielded by the doors, and can be controlled by an operator of the aircraft.

The main door 41 and hinge door 43 are mounted for movement between their open and closed positions be means of standard mechanisms well known in the art using crank arms and the like (not shown). The leg door 42 is mounted on, and is rotatable about, the leg 49 of the landing gear assembly 47. The leg door 42 is rotatably mounted on the leg 49 by means of two spaced apart hinges 51 fixed to the leg 49, and to the inside face of the door 42 at spaced-apart positions along an axis substantially parallel to the fore and aft edges 42$b$ and 42$c$. The hinges 51 are positioned roughly in line with the length of the leg 49. The exact position of the line along which the hinges 51 are attached depends on the relative positions of the aperture 44 and landing gear 47. Thus the main and hinge doors 41 and 43 can be rotated about axes parallel to the longitudinal length of the aircraft while the leg door 42, when the leg 49 is in its deployed position, can be rotated about a substantially vertical axis.

Hydraulic actuators are provided for controlling movement of the doors, for controlling the locking of the main and hinge doors 41 and 43 in open positions and, for controlling the locking of the leg door 42 in its fairing position. As the skilled person will appreciate, there are various actuator arrangements that could be used.

The operation of the doors will now be described with reference to FIGS. 12 to 14. During normal flight, the main door 41, leg door 42 and hinge door 43 are in their closed positions as shown in FIG. 12, with the landing gear 47 stowed in the fuselage and wing portions of the landing gear bay. During the aircraft's approach on landing, the main door 41 is opened by rotating it through about 60 degrees about an axis parallel, and adjacent to, the inner edge of the fuselage portion of the aperture 44 to the position shown in FIG. 13. In addition, the hinge door 43 is opened by rotating it through 90 degrees about an axis parallel, and adjacent to, the outer edge of the wing portion of the aperture 44, to the position shown in FIG. 13. As the main and hinge doors 41 and 43 open, the landing gear 47 also deploys (and therefore bringing with it the leg door 42), with the whole of the fuselage and wing portions of the aperture 44 open to allow the landing gear 47 to pass through the aperture 44. When the landing gear 47 is fully deployed only a small area of the aperture 44 is filled with the landing gear 47 (an area that in the closed position would be covered by the hinge door 43 and a portion of the leg door 42). The hinge door 43 would, if otherwise able to do so, be unable to move from the open position to the closed position because its movement would be obstructed by the deployed landing gear 47.

Once the landing gear 47 has been deployed, the landing gear 47 and hinge door 43 are locked in position. The main door 41 is then rotated back through 60 degrees to its closed position. While in the open position, the leg door 42 is moved into the fairing position by rotating it by about 30 degrees about the axis parallel to the landing gear leg 49 into the position shown in FIG. 14. In this position, the leg door 42 acts as a fairing by diverting the airflow substantially horizontally and diagonally (when viewed from above) away from the landing gear 47, thereby shielding the upper part of the landing gear. The amount of shielding of the landing gear depends of course on many factors including the angle at which the leg door 42 is positioned.

The leg door 42 remains in the fairing position throughout approach and landing of the aircraft. On take-off the leg door 42 is moved back to its open position to reduce drag and because noise considerations are less important during take-off. Before take off (while the landing gear is still deployed), the leg door 42 is therefore rotated back through 30 degrees returning it to its open position, as shown in FIG. 13.

The hinge door 43 remains open while the aircraft lands and, in due course, takes off again. After take-off when the landing gear needs to be stowed again, the main door 41 is opened and the landing gear 47 and attached leg door 42 are then retracted through the whole of the aperture 44 whilst the main and hinge doors 41 and 43 are simultaneously closed in a conventional manner.

FIG. 15 illustrates a sixth embodiment of the invention as applied to the main landing gear. The sixth embodiment is very similar to the fifth embodiment of the invention, except that in this embodiment, a forward portion only of the leg door 42 is arranged to act as a fairing. The door assembly includes the main and hinge doors 41 and 43 as described previously and a hinged leg door 60.

The hinged leg door 60 comprises two sections, a rotatable fore section 61 and a fixed aft section 62. Referring to FIG. 12, the fore section 61 of the leg door 60 is bounded by inner and outer side edges 61a and 61b, and fore and aft side edges 61c and 61d. The aft section 62 of the leg door 60 is of similar width (in the transverse direction) to the fore section 61, but of greater length (in the longitudinal direction) and is bounded by fore and aft longitudinal side edges, and inner and outer side edges. The aft edge of the fore section 61 is hinged to the fore edge of the aft section 62, the aft section 62 being fixedly mounted on the leg 49. Thus, the fore section 61 of the leg door 60 is mounted for fixed-axis rotation about an axis parallel to the landing gear leg 49.

In the open and closed positions, the leg door 60 is arranged in substantially the same positions as in the fourth embodiment, as shown in FIG. 8, as both sections 61, 62 of the leg door 60 are positioned flat against the landing gear leg 49.

On approach when landing and after the deployment of the landing gear has started, the fore section 61 of the leg door 60 is caused to rotate to the fairing position shown in FIG. 13, at which position the fore section is at an angle of about 45 degrees to its open position. In the fairing position, the fore section 61 of the leg door 60 is positioned with its fore and aft edges and extending substantially downwards from the aircraft and with its inner and outer edges and extending diagonally in front of the landing gear assembly 47. The aft section 62 of the leg door 60 remains in its open position.

Again, suitably arranged hydraulic actuators are provided for controlling the movement and the locking of the main door 41, the hinge door 42 and the fore section of the leg door 61.

FIGS. 16 and 17 illustrate a seventh embodiment of the invention as applied to the main landing gear. The seventh embodiment is very similar to the fifth and sixth embodiments of the invention, except that in this embodiment, the leg door is in the form of a hinged leg door 60 comprising an additional panel 63.

Thus, the hinged leg door 60 in this embodiment comprises three sections, a fore section 61, an aft section 62 and a panel section 63. FIG. 16 shows schematically a sectional plan view of the leg door 60 and the leg 49 of the landing gear when the leg door 60 is in its open position. The aft edge of the panel section 63 is hinged to the fore edge of the fore section 61 and the aft edge of the fore section 61 is hinged to the fore edge of the aft section 62. In a manner similar to the sixth embodiment, the fore section 61 of the leg door is mounted for rotation about an axis parallel to the landing gear leg 49 when in its deployed position and the aft section 62 is fixed to the landing gear leg 49. The panel section of the leg door 63 is also mounted for rotation about an axis parallel to the landing gear leg 49 in its deployed position.

In the open and closed positions, the leg door 60 is arranged in substantially the same positions as in the fourth embodiment, as both sections 61, 62 of the leg door 60 are positioned flat against the landing gear leg 49 and aligned with the longitudinal axis of the aircraft. The panel section 63 of the leg door 60 is in the open position folded back onto the fore section 61, so that in the closed position the panel section 63 is positioned on the landing gear bay side of the fore section 61. In the fairing position, as shown in FIG. 17, the fore section 61 and the panel section 63 of the leg door 60 are positioned to provide a V-shaped fairing positioned in front of the landing gear. Thus, during deployment the leg door 60 rotates downwardly from the closed position with the landing gear through an angle of about 90 degrees to the open position shown in FIG. 16 and then the leg door moves to a fairing position, wherein the first section 61 is rotated relative to the aft section 62 by means of the hinge arranged therebetween and the panel section 63 is rotated relative to the fore section 61 by means of the hinge arranged therebetween. The first section 61 rotates by an angle of about 50 degrees relative to the aft section 62 and the panel section 63 rotates by an angle of about 100 degrees relative to the fore section 61.

FIGS. 18 to 21 illustrate schematically an eighth embodiment of the invention, providing a V-shaped fairing on a main landing gear door assembly. The assembly includes a first door 70 that is substantially rectangular in shape and has a fore portion (or panel) 72 and an aft portion 73. The fore and aft portions are connected by a hinge 78 which facilitates rotation of the fore portion 72 about an axis transverse to the longitudinal edge 70a of the door and generally parallel to the surface of the door. The assembly also includes other doors illustrated schematically in FIGS. 18 to 21 by further door 74. The assembly additionally includes a fixed fairing 71 (mounted on the landing gear 10 by means of a connector 75 (shown in FIG. 21). The first door 70 is mounted for fixed axis rotation about a first longitudinal axis disposed at a location adjacent to a longitudinal outer edge 70a of the door.

In the closed position as shown in FIG. 18, the doors 70, 74 are positioned across and cover the rectangular shaped aperture 6 in the aircraft skin 7.

FIG. 19 shows a section view of the doors 70, 74 as they begin their movement from the closed position to an open position. The first door 70 moves in accordance with a first type of movement (being rotational movement about the first longitudinal axis). The landing gear 10 is shown beginning its movement from its stowed position. The landing gear 10 comprises wheels 11 and a central support column (or leg) 12 (all illustrated highly schematically in the Figures). The fixed fairing panel 71, moves together with the landing gear 10.

FIGS. 20 and 21 show the door 70 in its open and faired position and the landing gear 10 in a fully deployed position. As shown in section view in FIG. 20 the landing gear 10 is in a substantially vertical position extending down from the aircraft fuselage through the opening 6 in the aircraft skin 7. The first door 70 and fixed fairing 71 extend vertically down from the aircraft skin. The other doors 74 have moved back to the closed position.

FIG. 21 shows the shape of the fairing panel 71 which has a fore portion 76, and an aft portion 77 fixed in position relative both to each other and the landing gear 10. In the deployed position, when looking from above, the aft fairing portion 77 extends substantially parallel to the longitudinal axis of the aircraft and the fore fairing portion 76 of the fairing 71 extends diagonally from the end of the aft portion 77 towards the midline M of the landing gear 10. FIG. 21 also illustrates how the first door 70 acts as a fairing. The fore portion 72 of the door 70 moves in accordance with a second type of movement, wherein it is rotated about the hinge 78 during movement of the door from the closed position to the fully deployed position. Thus the fore portion 72 of the door 70 moves in both a first and a second type of movement simultaneously. The fore portion 72 of the door 70 and the fore portion 76 of the fairing panel 71 form a V-shaped fairing (as viewed from above) in front of the landing gear 10 that shields the landing gear 10 from the air flow A. As can be seen in FIG. 20, only a relatively small proportion of the landing gear 10 protrudes below the door 70 and fairing panel 71. In this embodiment, when the landing gear is fully deployed with the door 70 in the fairing position, the support column 12 and other parts (not shown) of the landing gear 10 are either substantially entirely shielded from the airflow A by the door 70 and fairing 71 or are within the fuselage of the aircraft.

Reference is made above to transverse crank arms and to longitudinal crank arms that allow a door to rotate about a transverse axis and about a longitudinal axis, respectively. It will be understood that the term "transverse" as used in "transverse crank arms" refers to the axis of rotation of the door and not to the shape or arrangement of the crank arm. Similarly, the term "longitudinal" as used in "longitudinal crank arms" refers to the axis of rotation, rather than the shape or arrangement of the crank arm.

It will be appreciated that various modifications may be made to the above-described embodiments of the invention without departing from the spirit of the invention. For example, in those embodiments where there are distinct closed, open-and-not-faired and open-and-faired positions for one or more parts of the door assembly the doors or portions thereof that act as fairings may be so arranged that the movement from the closed position to the open position and the movement to the fairing position occurs simultaneously. Similarly, some doors may be stationery during the time when the landing gear moves to its deployed position. In all embodiments, mechanisms may be provided so that the doors are movable directly from the closed position to the fairing position without proceeding via the open position with both the first and second types of movement occurring simultaneously. Typically, the doors will move directly from the closed position to the fairing position during the deployment of the landing gear for approach of the aircraft on landing (when reducing noise is most important). The door assemblies may be arranged such that during take-off the doors move from the fairing position to the open position to minimise drag on take-off. During take-off engine noise is at such a level that reducing noise generated by the landing gear is not as important as minimising drag.

The first, second, third and fourth doors of the door assembly of the first embodiment could each be of the same width and thus closing over a substantially rectangular aperture when in the closed position. As a consequence, the second and fourth doors when open would be shielded to a slightly lesser extent by the first and third doors when in the fairing position, but movement of the doors could as a result be simplified. For example, breakable linkages could be provided between the doors of this variation on the first embodiment to facilitate movement of (i) the first and second doors, (ii) third and fourth doors, and (iii) first and third doors together as a unit, the linkages being breakable, in the sense that they are able to couple and decouple. Thus, when moving the doors from the closed position to the open position, the first and second doors on the one hand and the third and fourth doors on the other hand are moved together as a unit.

The U-shaped frame of the second embodiment could be rotated together with the first and third doors with the first and third doors in their open or partially open, position. For example, the door assembly of the second embodiment could be arranged such that the first and third doors move from the fully open position to the fairing position without moving via the fully closed position. Thus, the first and third doors could move from the open position into the closed position simultaneously with downwards rotation of the U-shaped frame, thereby moving the frame and the doors into a fairing position as a unit. The first and third doors could therefore move with two different modes of rotational movement simultaneously.

Also, features from one embodiment could be used in another. For example, the panel section of the leg door of the seventh embodiment could be used in conjunction with the leg door of the fifth embodiment, without the leg door being divided into other sections. Other modifications will of course be apparent to the skilled person.

The invention claimed is:

1. An aircraft landing gear and door assembly comprising a landing gear and a door, the door being moveable to an open position, in which an aperture is exposed, the landing gear being able to be deployed through said aperture, the door being moveable to a closed position, in which the door is closed across the aperture, wherein at least a part of the door is arranged for movement of a first type, in which the door moves between the closed position and the open position, wherein at least a portion of the same door is also arranged for movement of a second type, in which said at least a portion of the same door moves to a fairing position in which it acts as a fairing to reduce the noise caused by the landing gear or a part thereof when the landing gear is in its fully deployed position, and wherein the first type of movement is different from the second type of movement, said door is coupled to the aircraft using a coupling mechanism that includes first and second linkages so arranged that when the assembly is installed on an aircraft, during movement of the first type the door is coupled to the first linkage and decoupled from the second linkage and during movement of the second type the door is decoupled from the first linkage and coupled to the second linkage.

2. An assembly according to claim 1, wherein the first type of movement is rotational movement.

3. An assembly according to claim 2, wherein the first type of movement is rotational movement about an axis, that in use, is substantially parallel to the length of the aircraft.

4. An assembly according to claim 1, wherein the first type of movement is rotational movement about a fixed axis.

5. An assembly according to claim 1, wherein the aperture has a longitudinal edge and wherein the first type of movement is rotational movement about an axis adjacent to the longitudinal edge of the aperture.

6. An assembly according to claim 1, wherein the second type of movement is rotational movement.

7. An assembly according to claim 1, wherein the second type of movement is rotational movement about an axis, that when the assembly is installed on an aircraft, is substantially transverse to the length of the aircraft.

8. An assembly according to claim 1, wherein the second type of movement is rotational movement about a fixed axis.

9. An assembly according to claim 1, wherein the second type of movement is rotational movement about a movable axis.

10. An assembly according to claim 1, wherein the second type of movement is rotational movement about an axis, that when the assembly is installed on an aircraft, is substantially parallel to the door when in the closed position.

11. An assembly according to claim 10, wherein the second type of movement is rotational movement about an axis, that when the assembly is installed on an aircraft, is substantially transverse to the length of the aircraft.

12. An assembly according to claim 10, wherein the aperture has a fore transverse edge and wherein the second type of movement is rotational movement about an axis adjacent to the fore transverse edge of the aperture.

13. An assembly according to claim 1, wherein the second type of movement is rotational movement about an axis, that in use when the door is in the position acting as a fairing, is substantially transverse to the door when the door is in the closed position.

14. An assembly according to claim 13, wherein the second type of movement is rotational movement about a movable axis.

15. An assembly according to claim 1, wherein the second type of movement of at least a portion of the same door is rotational movement about an axis, that when the assembly is installed on an aircraft, is substantially parallel to a surface of the door and moves with said at least part of the door as it moves between the open and closed positions.

16. An assembly according to claim 1, wherein the door assembly is so arranged that the first and second types of movement are effected simultaneously, for at least part of the respective movements.

17. An assembly according to claim 1, wherein the door comprises a first section hinged to a second section and the first section is arranged for movement of the second type, in which the first door section moves to the position in which it acts as a fairing.

18. An assembly according to claim 1, wherein, in the fairing position, said at least a portion of the door is positioned to divert air in a substantially downwards direction.

19. An assembly according to claim 1, wherein when the door is in the position acting as a fairing, at least a portion of the door is positioned to divert air in a substantially horizontal direction.

20. An assembly according to claim 1, wherein, in the position acting as a fairing, said at least a portion of the door is positioned to split the airflow, diverting a first portion of the airflow in a first direction and a second portion of the airflow in a second direction.

21. An aircraft including a landing gear and door assembly according to claim 1.

22. A method of reducing noise caused by landing gear on an aircraft including a step of manufacturing a landing gear door assembly according to claim 1.

23. A method of reducing noise caused by a landing gear in an aircraft including deploying a landing gear door assembly according to claim 1.

24. An aircraft landing gear and door assembly including a door movable to and from a closed position, in which the door is closed across an aperture, the aperture when open allowing a landing gear to be deployed through the aperture, wherein
    the door is arranged to rotate about a first axis substantially parallel to the length of the aircraft to move the door from the closed position to allow in use deployment of the landing gear through the aperture, and
    at least a portion of the door is rotatable about a second fixed axis, so as to move said at least a portion of the door to a fairing position in which it acts as a fairing to reduce the noise caused by the landing gear or a part thereof, the second fixed axis being both transverse to the length of the aircraft and substantially parallel to the door in a closed position.

25. An assembly according to claim 24, wherein the second axis is disposed at a location adjacent to a fore transverse edge of the aperture.

26. An assembly according to claim 24, wherein said portion of the door in its fairing position acts as a fairing in the form of a ramp.

27. A door assembly for an aircraft landing gear bay, the door assembly comprising a door moveable between a closed position and a fully open position, the fully open position defined as creating a gap within an aircraft landing gear bay sufficient for the extension of a landing gear, wherein
    at least part of the door is arranged for movement of a first type, in which the door moves from the closed position to the fully open position,
    at least a portion of the same door is also arranged for movement of a second type, in which said at least a portion of the door moves to a landing gear fairing position the landing gear fairing position defined as positioning said at least a portion of the door so as to be able to act as a fairing for a fully extended landing gear, said at least a portion of the same door is arranged to move along a first path during the first type of movement and is arranged to move along a second path during the second type of movement, and the first path is different from the second path.

28. An assembly according to claim 27, wherein the second type of movement is rotational movement about a movable axis.

29. An assembly according to claim 27, wherein the second type of movement is rotational movement about an axis, that in use when the door is in the position acting as a fairing, is substantially transverse to the door when the door is in the closed position.

30. An assembly according to claim 29, wherein the second type of movement is rotational movement about a movable axis.

31. An assembly according to claim 27, wherein the door assembly is so arranged that the first and second types of movement are effected simultaneously, for at least part of the respective movements.

32. An assembly according to claim 27, wherein the door comprises a first section hinged to a second section and the first section is arranged for movement of the second type, in which the first door section moves to the position in which it acts as a fairing.

33. An assembly according to claim 27, wherein when the door is in the position acting as a fairing, at least a portion of the door is positioned to divert airflow from the landing gear.

34. An assembly according to claim 27, wherein, in the position acting as a fairing, said at least a portion of the door is positioned to split the airflow, diverting a first portion of the airflow in a first direction and a second portion of the airflow in a second direction.

35. An assembly according to claim 27, wherein said at least a portion of the same door is arranged such that during movement of the second type said at least a portion of the door moves to a landing gear fairing position from a semi-closed position, the semi-closed position defined as creating a gap within an aircraft landing gear bay, but the gap being insufficient for the extension of a landing gear.

36. An assembly according to claim 27, wherein the second path does not extend along any part of the first path.

* * * * *